United States Patent
Bromberg et al.

(10) Patent No.: US 9,909,491 B2
(45) Date of Patent: Mar. 6, 2018

(54) ENGINE REFORMER SYSTEMS FOR LOWER COST, SMALLER SCALE MANUFACTURING OF LIQUID FUELS

(71) Applicant: Massachusetts Institute Of Technology, Cambridge, MA (US)

(72) Inventors: Leslie Bromberg, Sharon, MA (US); William H. Green, Belmont, MA (US); Alexander Sappok, Cambridge, MA (US); Daniel R. Cohn, Cambridge, MA (US); Amrit Jalan, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 104 days.

(21) Appl. No.: 14/867,500

(22) Filed: Sep. 28, 2015

(65) Prior Publication Data
US 2016/0017794 A1    Jan. 21, 2016

Related U.S. Application Data

(63) Continuation of application No. 13/828,140, filed on Mar. 14, 2013, now Pat. No. 9,169,773.
(Continued)

(51) Int. Cl.
*F02B 63/00* (2006.01)
*F02B 65/00* (2006.01)
(Continued)

(52) U.S. Cl.
CPC ............. *F02B 65/00* (2013.01); *C01B 3/366* (2013.01); *C01B 13/0259* (2013.01); *F02B 1/12* (2013.01);
(Continued)

(58) Field of Classification Search
CPC . F02B 65/00; B02B 2/23; C02B 3/366; C02B 2203/061; C01B 13/0259;
(Continued)

(56) References Cited

U.S. PATENT DOCUMENTS 2,543,791 A    3/1951  Malin
2,578,475 A   12/1951  Hirsch et al.
(Continued)

OTHER PUBLICATIONS

Gas Technology Institute, Partial Oxidation Gas Turbine Feasibility Study, Apr. 2010, 200 pages, "Partial Oxidation Gas Turbine for Power and Hydrogen Co-Production from Coal-Derived Fuel in Industrial Applications", Final Report, DOE Award No. DE-FC26-05NT42649, Rabovitser.
(Continued)

*Primary Examiner* — Marguerite McMahon
(74) *Attorney, Agent, or Firm* — Nields, Lemack & Frame, LLC

(57) ABSTRACT

A reformer-liquid fuel manufacturing system that utilizes an engine to generate hydrogen-rich gas is disclosed. The engine operates at very rich conditions, such as $2.5<\phi<4.0$. In doing so, it creates an exothermic reaction, which results in the production of syngas. In addition, the system utilizes the energy from the exothermic reaction to rotate a shaft and also utilizes the heat in the syngas to heat the reactants. A mechanical power plant is in communication with the rotating shaft and can be used to produce oxygen, provide electricity or operate a compressor, as require. The hydrogen-rich gas is supplied to a chemical reactor, which converts the gas into a liquid fuel, such as methanol.

31 Claims, 19 Drawing Sheets

Related U.S. Application Data

(60) Provisional application No. 61/635,041, filed on Apr. 18, 2012.

(51) Int. Cl.
*C01B 3/36* (2006.01)
*C01B 13/02* (2006.01)
*F02B 1/12* (2006.01)

(52) U.S. Cl.
CPC ............... *C01B 2203/025* (2013.01); *C01B 2203/0255* (2013.01); *C01B 2203/06* (2013.01); *C01B 2203/061* (2013.01); *C01B 2203/1241* (2013.01); *Y02E 60/324* (2013.01)

(58) Field of Classification Search
CPC ........ C01B 2203/0255; C01B 2203/06; C01B 2203/025; C01B 2203/1241
USPC .......................................... 123/543–558, 1, 3
See application file for complete search history.

(56) References Cited

U.S. PATENT DOCUMENTS

| | | | |
|---|---|---|---|
| 2,591,687 A | 4/1952 | Eastman et al. | |
| 2,846,297 A | 8/1958 | Herwig | |
| 4,004,554 A | 1/1977 | Kosaka et al. | |
| 4,059,076 A | 11/1977 | Kosaka et al. | |
| 4,108,114 A | 8/1978 | Kosaka et al. | |
| 4,222,351 A | 9/1980 | Kosaka et al. | |
| 4,965,052 A | 10/1990 | Lowther et al. | |
| 5,162,599 A | 11/1992 | Matturro et al. | |
| 5,231,968 A | 8/1993 | Siefkes | |
| 5,887,554 A | 3/1999 | Cohn et al. | |
| 6,174,460 B1 | 1/2001 | Grunvald et al. | |
| 6,205,957 B1 | 3/2001 | Saylor | |
| 6,725,846 B2 * | 4/2004 | Armstrong | F02G 5/00 123/549 |
| 9,169,773 B2 * | 10/2015 | Bromberg | C01B 3/366 |
| 2005/0229908 A1 * | 10/2005 | Kuzuyama | F02D 35/025 123/552 |
| 2006/0260562 A1 | 11/2006 | Otterstrom et al. | |
| 2009/0299795 A1 | 12/2009 | Khan et al. | |
| 2010/0280135 A1 * | 11/2010 | Doty | C01B 3/02 518/703 |
| 2011/0100323 A1 | 5/2011 | Bradley et al. | |
| 2013/0025573 A1 * | 1/2013 | Klingbeil | F02D 19/0642 123/525 |
| 2014/0144397 A1 | 5/2014 | Bromberg et al. | |
| 2015/0000290 A1 * | 1/2015 | Joshi | F02C 3/30 60/772 |
| 2015/0191352 A1 * | 7/2015 | Chen | H01M 8/0618 429/425 |

OTHER PUBLICATIONS

The New York Times, Business Day, Energy & Environment, Apr. 22, 2013, http://www.nytimes.com/2013/04/23/business/energy-environment/natural . . . , 5 pages, "Trucking Industry Is Set to Expand Its Use of Natural Gas", Cardwell, et al.

Reaction Design, Tutorials Manual, 2007, Chapter 2: Combustion in Gas-phase Processes, "2.7: Particle Tracking Module/2.7.1 Soot Formation and Growth in a JSR/PFR Reactor", pp. 78-85, Chou, et al.

Fuel Processing Technology, vol. 70, 2001, pp. 115-134, "A review of air separation technologies and their integration with energy conversion processes", Smith, et al.

International Search Report and Written Opinion dated Jul. 11, 2013 in corresponding PCT application No. PCT/US2013/035198.

Chinese communication, with English translation, dated May 30, 2016 in corresponding Chinese patent application No. 201380031981.X.

European communication dated Nov. 16, 2015 in corresponding European patent application No. 13777596.1.

* cited by examiner

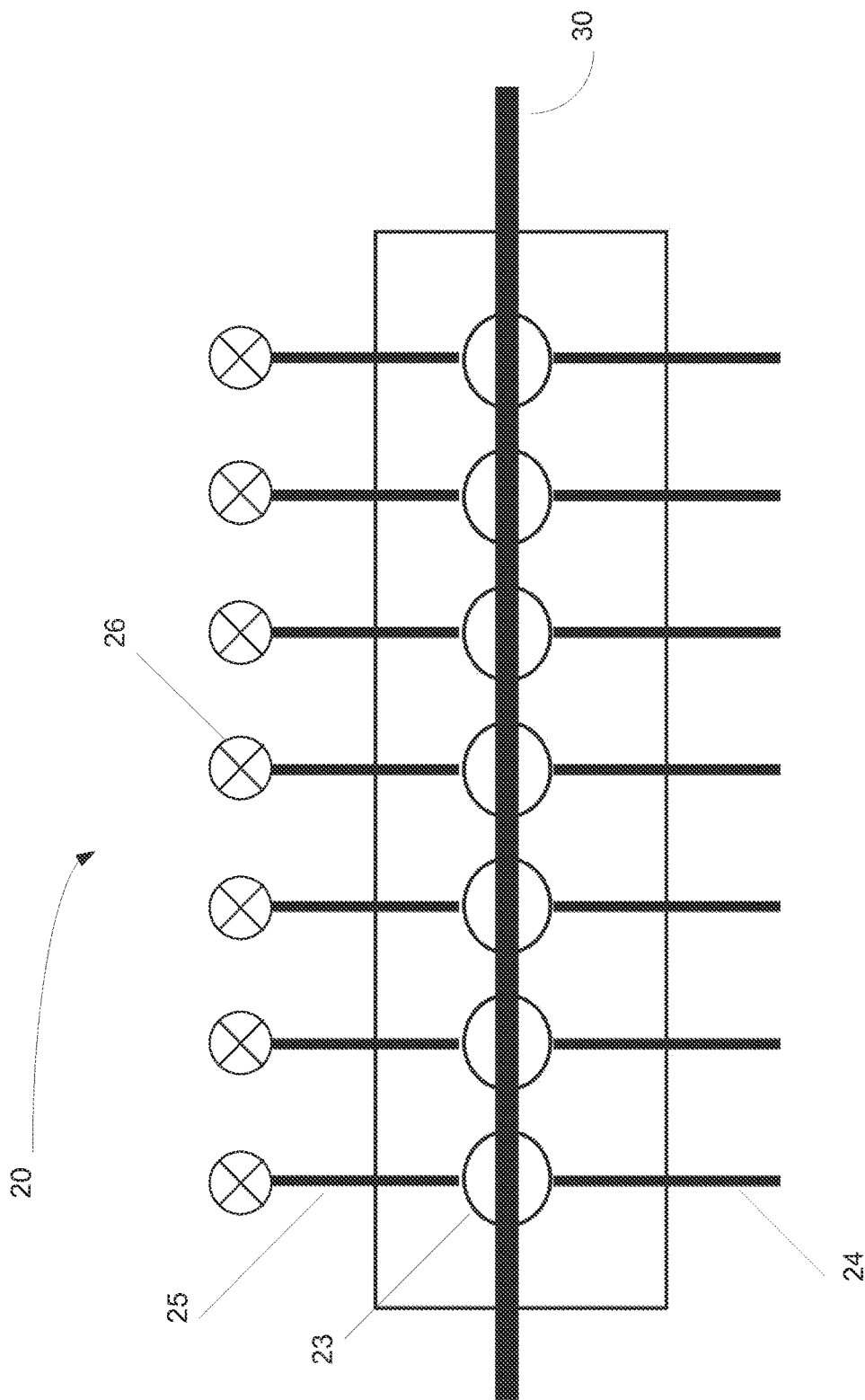

ENGINE REFORMER SYSTEMS FOR LOWER COST, SMALLER SCALE MANUFACTURING OF LIQUID FUELS

This application is a continuation of U.S. patent Ser. No. 13/828,140, filed Mar. 14, 2013, which claims priority of U.S. Provisional Patent Application Ser. No. 61/635,041, filed Apr. 18, 2012, the disclosures of which are incorporated herein by reference in their entireties.

BACKGROUND

Conventional methanol and other gas to liquid (GTL) production systems use natural gas or other hydrocarbon gasses as input fuels and produce liquids, such as, for example, methanol, gasoline or diesel fuel. The feedstock is first converted to syngas (a combination of hydrogen and carbon monoxide, referred to as "hydrogen-rich gas") in a fuel reformer. These reformers are catalytic reactors which may use, for example, steam reforming, dry reforming (using $CO_2$), partial oxidation or autothermal operation. These techniques include both exothermic conversion reactions, such as partial oxidation, or endothermic ones, such as steam reforming or dry reforming. These systems are typically of substantial size in order to minimize cost, due to substantial economies-of-scale.

Commercial manufacturing plants tend towards the size of "megaplants," producing, in the case of methanol more than 1 million tons of methanol per year, or in the case of diesel, up to 100,000 barrels/day. There are issues with these very large plants, including long construction periods, with substantial cost overruns (particularly for plants that produce diesel fuel) and construction delays, and difficulty in predicting markets over the long construction period. In addition, to create this amount of methanol, the plant must be supplied with a considerable amount of reactant. Thus, the commercial plants are typically supplied by a pipeline which deliver the necessary reactant gas, or next to natural gas wells of substantial productivity.

For natural gas or biomass based feedstock that are difficult or expensive to transport, conventional commercial manufacturing plants cannot be used. Therefore, it may be desirable to make smaller, lower cost reformers in order to minimize the transportation distance from the collection site. Gaseous streams include natural gas (from shale or other sources) that may be difficult or impossible to introduce into a pipeline. Other examples include small scale isolated gas production, natural gas generated in off-shore drilling rigs and biogas, produced from landfills or from anaerobic digesters.

Therefore, there is a need for lower cost, smaller scale reformer systems to be used in the distributed conversion of gas to methanol and other gas to liquid (GTL) products. This need is particularly strong to fully exploit the increased availability of low cost natural gas.

Furthermore, in order to minimize the cost of the reformer and the complete GTL plant, it would be desirable to integrate the components, including compressors, generators and motors, reformer, gas clean up units, and catalytic reactor for making the fuels such as methanol or Fischer-Tropsch diesel.

In some embodiments, such as partial oxidation and other type of reformers, it would also be attractive to recover a fraction of the energy produced in the process. This energy can be used to make the unit self-reliant in energy, reduce the cost of other subsystems in the GTL plant or converted into electricity for external sale. In addition to the production of fuels, the same system can be employed to produce other chemicals, such as ammonia, in a similar manner.

SUMMARY

A reformer system that utilizes an engine to generate hydrogen-rich gas for liquid fuel production is disclosed. The engine operates at very rich conditions, such as $2.5 < \phi < 4.0$ where $\phi$ is the equivalence ratio. In doing so, it creates an exothermic reaction, which results in the production of the hydrogen-rich gas. In addition, the system utilizes the energy from the exothermic reaction to rotate a shaft and also utilizes the heat in the syngas to heat the reactants, while providing hot reformate for the liquid fuel making reactor downstream from the reformer. A mechanical power plant is in communication with the rotating shaft and can be used to produce oxygen, provide electricity or operate a compressor, as required. The hydrogen-rich gas is supplied to a chemical reactor, which converts the gas into a liquid fuel, such as methanol.

BRIEF DESCRIPTION OF THE FIGURES

For a better understanding of the present disclosure, reference is made to the accompanying drawings, which are incorporated herein by reference and in which:

FIG. 7 shows an embodiment of the engine reformer;

DETAILED DESCRIPTION

Reciprocating engines can provide a means to considerably reduce the cost of very small scale reformer-liquid fuel production systems. A substantial elimination of system components can be achieved if the fuel is reformed in the reciprocating engine. The percentage cost reduction is greatest for systems that produce methanol. These units may be particularly suitable for very small scale applications. These reformers are referred to as "engine reformers".

Although in the past, engine reforming has been attempted, it is not practical for the generation of syngas for manufacturing fuels, as the conditions are not suitable for generation of syngas of sufficient quality. In order to generate syngas, conditions of the engine are such that conventional engine operation is not possible. For partial oxidation, the reaction products are hydrogen and carbon monoxide with minimal CO$_2$ and water production, as shown below.

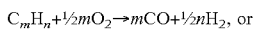

$$C_mH_n + \tfrac{1}{2}mO_2 \rightarrow mCO + \tfrac{1}{2}nH_2, \text{ or}$$

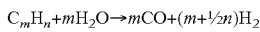

$$C_mH_n + mH_2O \rightarrow mCO + (m + \tfrac{1}{2}n)H_2$$

To achieve these reactions, the fuel/air ratio for syngas production divided by the air/fuel ratio for complete combustion of the fuel (i.e., the equivalence ratio, or φ), needs to be very high (φ>3 for natural gas), and the flame from the ignition point in a conventional spark ignition engine would not propagate. In the case of diesel engines, the process of diffusion flame would fully combust the fuel, generating large amounts of water and CO$_2$, undesirable for liquid fuel production.

While engine based reformers have been suggested in the past, it has only been for on-board generation of hydrogen for improved vehicle performance, such as reduced emissions, or improved efficiency. Integration of an engine based reformer into a fuel manufacturing plant has not been suggested, nor have the conditions and features required for efficient reforming, with fuel/oxidant ratio close to partial oxidation conditions, been disclosed. Thermal cracking of natural gas been also been explored using engines, as means of upgrading natural gas into C2 compounds but previous work did not explore the possibility of making syngas.

Figure 13:
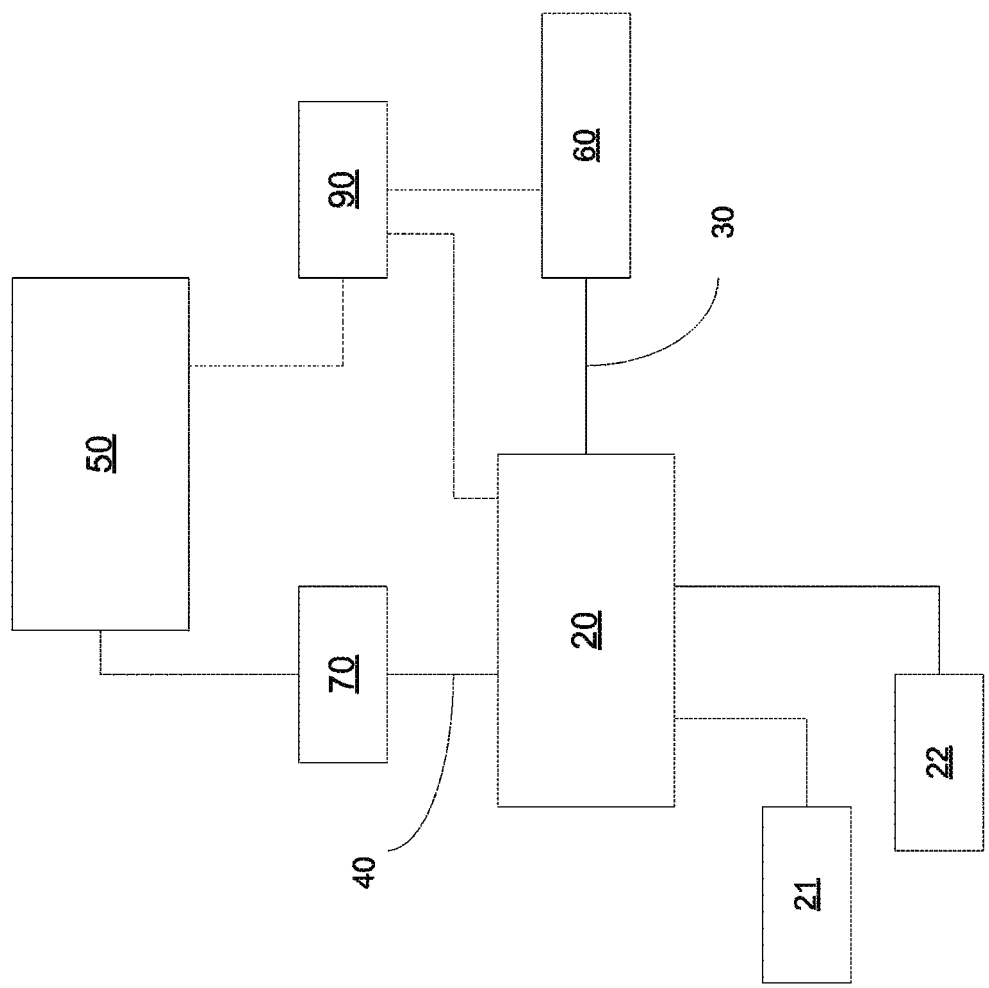
FIG. 13 illustrates a fuel manufacturing plant using an engine-based reformer.

FIG. 13 shows a fuel manufacturing plant 10 which utilizes an engine-based reformer 20. The engine-based reformer 20 includes one or more cylinders, each having a chamber with a reciprocating piston disposed therein. The pistons communicate with a rotating shaft 30. The engine-based reformer receives a gaseous hydrocarbon fuel 21, such as natural gas, and an oxidant 22, such as air, oxygen-enriched air or oxygen, as reactants. The oxidant 22 may be generated in a variety of ways, as described herein. The hydrocarbon fuel 21 and the oxidant 22 may be mixed upstream of the engine-based reformer 20, in the inlet manifold or in the cylinders.

The reaction between the reactants 21,22 is exothermic, releasing large amounts of heat, which can be used by the system 10. After processing the reactants 21,22, the engine-based reformer 20 generates mechanical power in the form of a rotating shaft 30, chemical energy in the form of syngas 40 (a mixture of hydrogen and carbon monoxide) and heat. The syngas 40 may pass through a heat exchanger 70, where it imparts heat onto another fluid, such as the hydrocarbon fuel 21 or the oxidant 22. The syngas 40 may pass through a compressor (which may be located in the mechanical power plant 60) to increase the pressure to that required by the chemical reactor 50. The syngas is then fed into a chemical reactor 50, which converts the syngas to a liquid fuel, such as, for example, methanol or FT diesel. Any gas that exits the chemical reactor 50 may be referred to as tail gas. The tail gas can be recirculated through the chemical reactor 50 in order to increase conversion, or it can be sent to the engine 20 for either combustion or to assist the reforming operation, or a combination of the two (some recirculated through the chemical reactor 50 and the rest going to the engine 20). The rotating shaft 30 may be used to provide power to a mechanical power plant 60. The mechanical power plant 60 may generate, for example, electricity. Alternatively, the mechanical power plant 60 may be used to directly power a compressor/vacuum pump for an oxygen generation unit, for example, avoiding the costs of a larger generator and a motor. A controller 90 may be in communication with the chemical reactor 50, the engine 20 and the mechanical power plant 60 to control the overall operation of the system 10.

A key to creating an effective engine-based reformer is the partial combustion of the hydrocarbon fuel 21 and the oxidant 22. Two possible approaches for addressing this situation include spark ignition of the hydrocarbon fuel 21 with an oxidant 22, such as oxygen or air, and using autoignition of premixed air/fuel or oxygen/fuel mixtures, also known as homogeneous charge compression ignition (HCCI), or its low temperature combustion variants, such as PCI (partially premixed compression ignition) or RCCI (Reaction Controlled Compression Ignition).

First, the requirements for the spark ignition option will be discussed. The oxidant 22 and the hydrocarbon fuel 21 can be premixed in the inlet manifold, and injected into the engine-based reformer 20. Alternatively, it is possible, for example, to directly inject the oxidant 22 into a cylinder, especially if it is heated oxygen, as the oxygen volume that needs to be introduced is less than the volume of fuel, even in the case of methane. Alternatively the oxygen may be introduced in the inlet manifold and the hydrocarbon fuel 21 may be directly injected into the cylinder of the engine.

In the case of partial oxidation, the oxidant can be oxygen, in the case where nitrogen is not desired, such as in the production of methanol or FT diesel fuel. However, in other embodiments, the oxidant 22 may be air or oxygen enriched air, especially, for example, for the production of ammonia, where nitrogen is required in the process.

Figure 14:
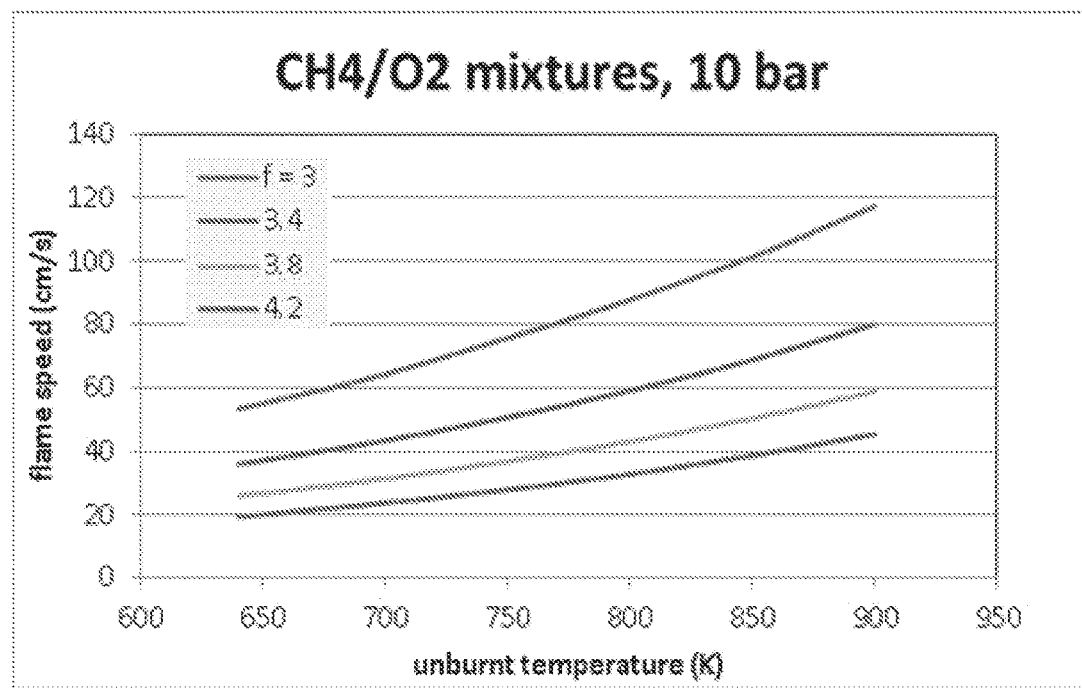
FIG. 14 shows laminar flame characteristics in methane/oxygen as a function of unburnt fuel temperature and equivalence ratio at 10 bar.

In the case of oxygen combustion, the laminar flame characteristics of the fuel have been studied. Shown in FIG. 14 is the flame speed for the case of methane and oxygen, as a function of the unburnt CH$_4$/O$_2$ temperature, in K, and the equivalence ratio φ (depicted as f in the figure). It has been determined that for operation at 10 bar and 700 K, the laminar flame speed for the case of $\phi\sim3$ in oxygen is more than about half the flame speed for stoichiometric combustion ($\phi=1$) of methane in air at the time of sparking in conventional SI engines, which is typically about 10 bar and 640 K. The flame speed can be used to provide a useful frame of reference to determine misfire, which is very difficult to calculate. The flame speed at time of sparking is about the same as that of liquid fuels (gasoline) running stoichiometrically, or about 30-40 cm/s. Thus, conventional sparking would be possible with partial oxidation combustion of methane in oxygen for the conditions in FIG. 14 with flame speeds greater than approximately 30-40 cm/s. Table 1 shows the flame speed and peak flame temperature of very fuel-rich oxygen/methane mixtures as a function of the equivalence ratio. The ideal condition for partial oxidation of methane is $\phi=4$. However, note that even for $\phi=3.5$, the flame speed is already fairly reduced, and it is unlikely to result in adequate combustion stability, unless it operates at temperatures greater than 700-750 K (at the time for sparking, or about 50-100 K hotter than in the case of SI stoichiometric operation in air/methane mixtures). Further, the methane conversion is also reduced under these conditions.

TABLE 1

Main characteristics of oxygen/methane laminar flames

| $\phi$ | flame speed (cm/s) | Peak temperature (K) | CH4 conversion | C2H2 molar concentration |
|---|---|---|---|---|
| 3 | 28 | 2022 | 0.90 | 0.044 |
| 3.2 | 21 | 1942 | 0.86 | 0.057 |
| 3.4 | 17 | 1881 | 0.82 | 0.064 |
| 3.5 | 15 | 1850 | 0.79 | 0.065 |

Figure 15:
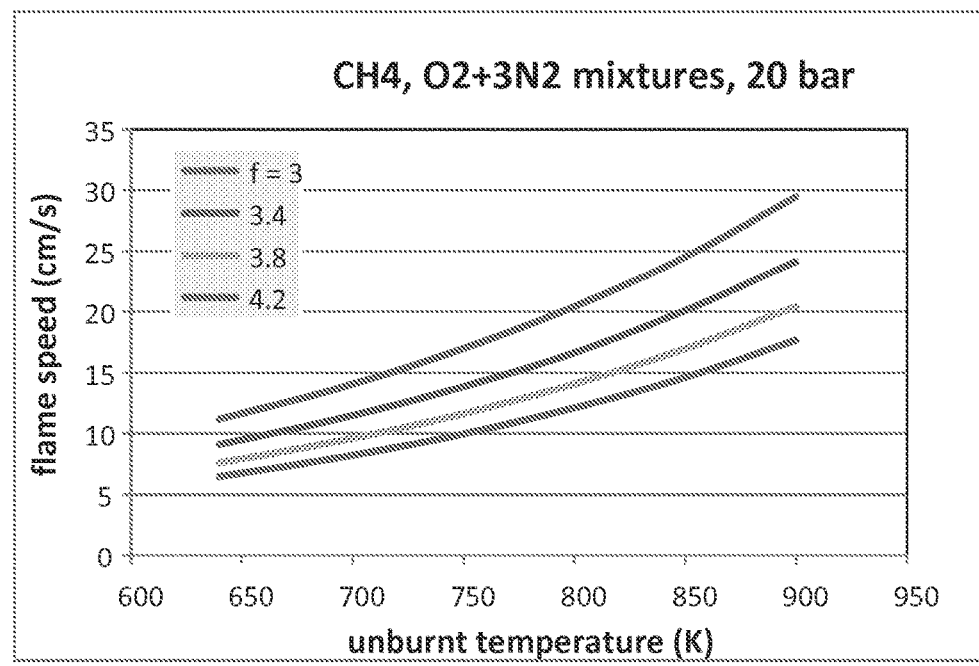
FIG. 15 shows laminar flame characteristics in methane/oxygen enriched air as a function of unburnt fuel temperature and equivalence ratio at 20 bar.

The flame speed for oxygen enriched air has also been calculated to determine sparking possibility with nitrogen diluent. It has been determined that by preheating the air/fuel mixture, it is possible to get adequate flame speeds, even at compositions as high as 33% $O_2$-67% nitrogen (molar). FIG. 15 shows the flame speeds under these conditions, as a function of the equivalence ratio $\phi$ and the temperature. In order to obtain sufficient flame speed to avoid misfire, temperatures higher than 800 K (i.e., 150 K hotter than in the case of stoichiometric methane/air mixtures) are required and equivalence ratios close to $\phi\sim3$ are needed. Note that the temperature at time of sparking is about double the temperature at inlet valve closing, so the temperature addition at time of inlet valve closing is less than that indicated in the FIGS. 14 and 15. For the case of oxygen-enriched air, the heating of the methane air at inlet valve closing needs to be about 75 K hotter compared to stoichiometric methane/air mixtures.

As described above, for misfire avoidance it may be useful to preheat the hydrocarbon fuel 21, the oxidant 22, or both prior to introduction to the inlet manifold of the engine 20. A metallic foam heat exchanger can be a particularly effective way of transferring heat from syngas to the hydrocarbon and/or oxidant. A typical ratio of the temperature at time of ignition to the in-cylinder temperature at time of inlet valve closing is about 2 (i.e., for an in-cylinder temperature of 330 K at time of inlet valve closing, the temperature at times typical for ignition is 640 K). FIG. 14 shows that adequate flame speed occurs at about 700-750 K at $\phi\sim3.8$. Thus, for robust performance using the 2:1 temperature ratio described above, an in-cylinder temperature at time of inlet valve closing of about 350-375 K is required. In the case of oxygen enriched air, as shown in FIG. 15, the temperature at time of sparking needs to exceed about 850-900 K for $\phi\sim3$-3.4, requiring in-cylinder temperatures of more than 425-450 K at inlet valve closing time. Even then, operation in air will require advanced sparking, as described below. In one embodiment, the fuel 21, oxidant 22, or both can be routed through the heat exchanger 70 (see FIG. 13) prior to introduction to the engine. It may be beneficial to heat the fuel 21 and oxidant to temperatures greater than 350 K, and in other embodiments, greater than 450 K. In other embodiments, other types of heaters may be used. These may be powered, for example, by electricity provided by the mechanical power plant 60. It is possible to heat the fuel 21 and oxidant 22 separately in the heat exchanger 70 and then remixed later, or mixed upstream from the heat exchanger 70.

In some embodiments, it may be desirable to use advanced sparking techniques, including high power spark systems, multiple discharge sparks, or "diesel-like" sparking by the injection of a high cetane number fuel, such as diesel or DME. DME could be obtained from the product methanol, where the methanol is manufactured by the chemical reactor 50 downstream from the reformer. It is desired that the energy provided by the pilot-fuel sparking be a small fraction of the energy provided by the reforming process.

The high energy ignition source may also be provided through the addition or use of a pre-combustion chamber. In one embodiment, the pre-combustion chamber may screw into the spark plug port of a spark ignition (SI) engine, or be integrated into the engine design. The pre-combustion chamber may be supplied with fuel and contain a spark-plug or other ignition source. Use of the pre-combustion chamber may provide significantly more energy to ignite the rich mixture in the main cylinder than may be provided using conventional advanced sparking techniques, such as multi-spark and high-power spark systems. Examples of a commercial pre-combustion chamber for natural gas engines and diesel engines, among others, are known to those skilled in the art.

Figure 16:
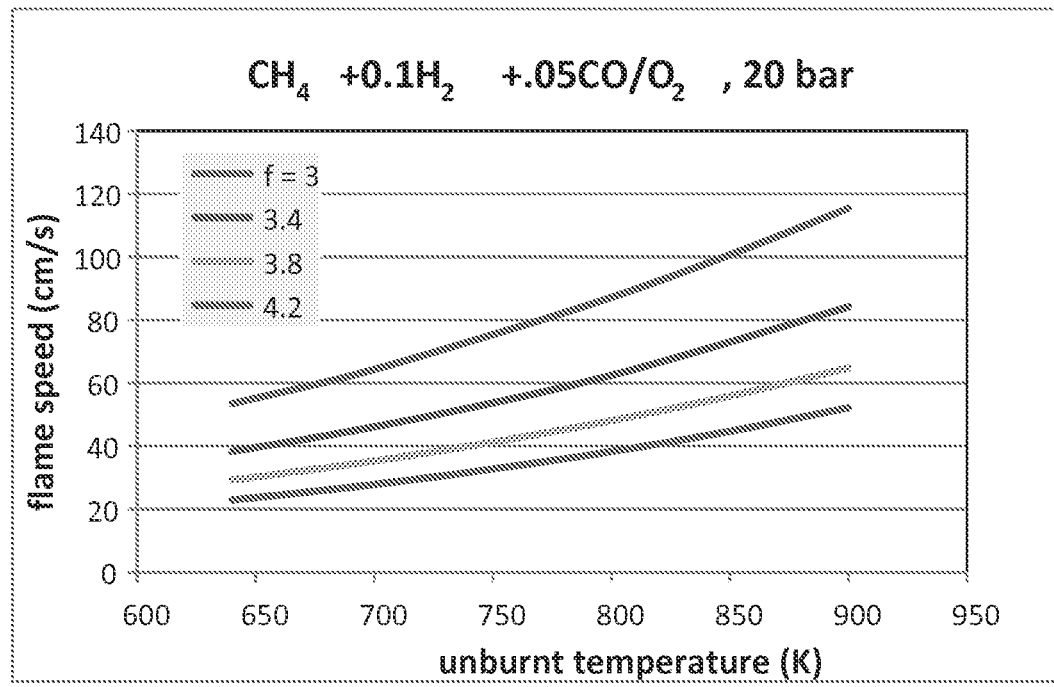
FIG. 16 shows laminar flame characteristics for methane and some residuals as a function of unburnt fuel temperature and equivalence ratio in oxygen at 20 bar.

Some syngas will remain in the cylinder, even in the case of optimal valve timing because of the finite volume in the cylinder at TDC. FIG. 16 shows the flame speed as a function temperature and equivalence ratio, for engine conditions with about 10% residual fraction (molar volume of residuals as a fraction of the molar volume of the methane/oxygen mixture). It should be noted that the sensitivity of the flame speed to the residuals is small, further illustrating the robustness of the performance of the engine-reformer.

The engine can run with turbocharging in order to allow for downsizing, resulting in decreased friction losses and thus increased efficiency. Inlet manifold pressures as high as 4-5 bar can be used and are typical of heavy duty engines. These turbochargers exist, although they tend to operate at relatively low temperatures. By using automotive components, such as the turbocharger or supercharger, it is possible to minimize the cost of the system, eliminating expensive compressors.

Figure 17:
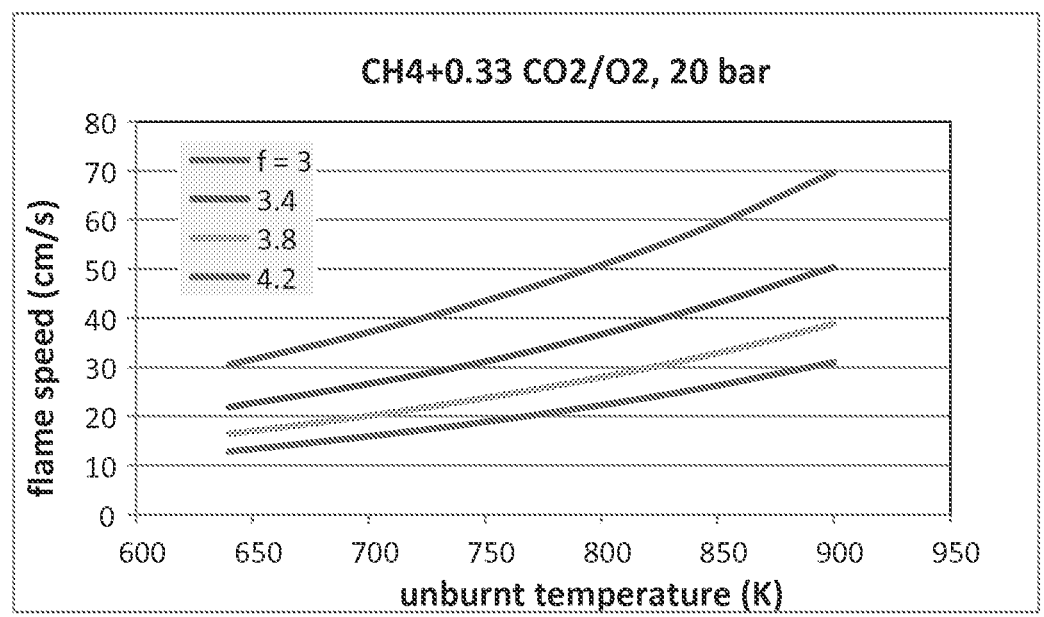
FIG. 17 shows laminar flame characteristics in biogas as a function of unburnt fuel temperature and equivalence ratio.

In the case of bio-gas (i.e., gas generated from the anaerobic decomposition of organic matter), the flame speed for typical compositions as a function of the temperature and equivalence ratio is shown in FIG. 17. While slightly higher temperatures are required, the ignition is robust, even at high values of equivalence ratios.

Figure 18:
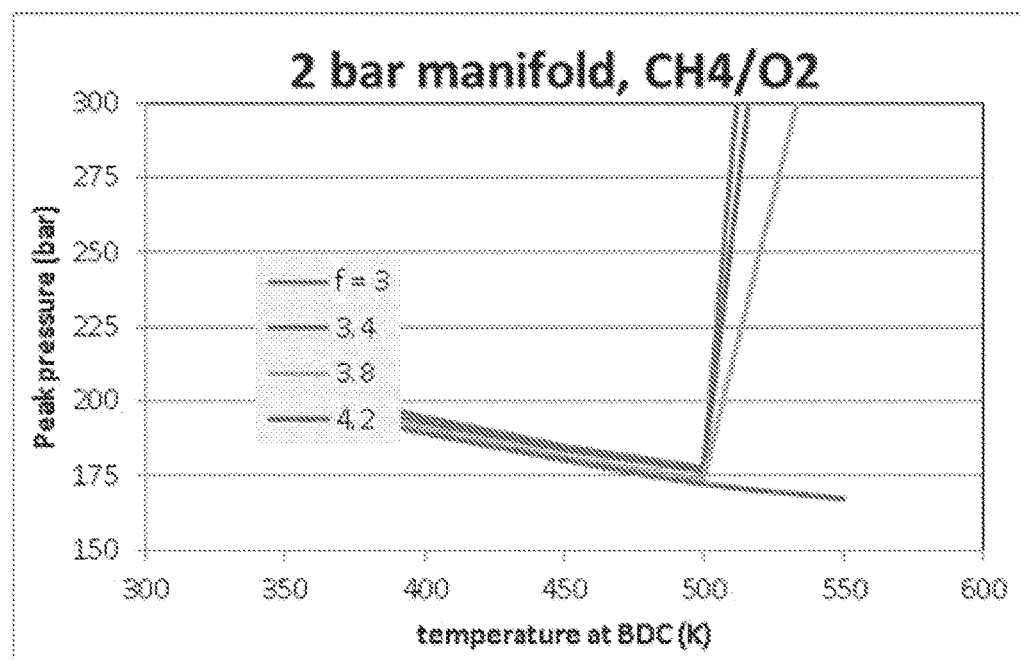
FIG. 18 shows the peak pressure as a function of in-cylinder temperature at time of inlet valve closing for different equivalence ratios where the large increase in pressure is due to knock.

For SI engine operation, in addition to misfire, which is addressed above through flame speed calculations above, a second issue is knock. Knocking of very rich mixtures of methane and oxygen, with relatively high compression ratios, was determined not to be an issue, as long as the in-cylinder temperatures are lower than about 500-550 K at time of inlet-valve closing. FIG. 18 shows the peak pressure as a function of in-cylinder temperature at time of inlet valve closing for different equivalence ratios (depicted as f). The sharp kink in the curves indicates autoignition (i.e., knock). Thus, for the conditions in FIG. 18, as long as the temperature is below 500-550 K at the time of inlet valve closing, the engine reformer should not experience knock. In addition, in a spark ignition engine, it should be possible to prevent ignition by using spark retard. Although the efficiency of the cylinder for producing power would be lower with spark retard, for the application to engine reformers, it is not critical. Sensor-based knock suppression control strategies may also be used. If there is a problem with knocking, it may be controlled by injection of an alcohol based fuel or water or a combination, by the use of other diluents, included cool syngas and/or tail gas.

Thus, various inlet conditions that result in robust combustion and avoid misfire in SI operation of engine reformers are disclosed. The operating window is sufficient. Spark retard can be used to increase it further. In the case of nitrogen dilution, the temperature required for robust sparking and the temperature limit for knock both increase, keeping a window of operating conditions.

The second mode of operation of the engine is with low temperature combustion modes, such as HCCI or variant thereof, such as Partial Compression Ignition (PCI) or Reaction Controlled Compression Ignition (RCCI), where the air/fuel mixture is not homogeneous. Appropriate HCCI conditions for reforming in air for $\phi\sim3$, with the use of temperature stratification have been determined. Sufficient in-cylinder temperature at time of inlet valve closing is required, as will be shown below.

In an engine, some cylinders can be operating as SI, some as HCCI. In addition, some or all the cylinders can operate on both modes (not simultaneously). Flexibility of operation, using the advantages of each mode, can be achieved. For example, a spark plug or other ignition mechanism may be disposed in each cylinder. When used in low temperature combustion mode, the spark is not ignited. In other embodiments, some cylinders may be dedicated to low temperature combustion mode, where no spark plug is provided.

It is possible to also have oxidant/fuel stratification, but in the calculations shown below, only temperature stratification is illustrated. Temperature stratification is needed in order to decrease the rate of heat release of the combustion and the associated rate of pressure rise in the cylinder for the case of HCCI. Alternatively, diluents can be used to adjust the rate of pressure rise. Included in the calculations are relatively high concentrations of water as the diluent. In addition, it is possible to use some of the cool syngas produced for dilution, or to use the tail gas from the process.

If water is to be used as the diluent, it could be directly injected into the cylinder. If done late enough in the cycle, it can produce substantial inhomogeneities in the cylinder, such as the ones described above needed to reduce the rate of pressure rise and the peak pressure. In order to operate under these conditions, the rate of water injection has to be relatively fast. Water injection with good atomization of the water droplets to prevent wall wetting by the water and subsequent removal of the oil film, is needed. High pressure injection of the water is required, both to achieve good atomization as well as to achieve high injection rates, as the cylinder pressures are high. It should be noted that the engine power, and the efficiency can be increased if the water is introduced as liquid into the cylinder, and the evaporation occurs in the cylinder. Large difference in temperature and composition throughout the cylinder can be generated in this manner.

It may be possible to use passive diluents. Nitrogen could be used, but it could generate some NOx or other carbon-nitrogen compounds (such as HCN) because of the high temperatures. Because it may be possible to run the system in a closed loop, it may be possible to use other diluents. For example, argon could be used as a diluent. Argon may be produced in an air-separation unit, which may be part of the mechanical power plant 60. The tail gas would be composed mainly of argon, with left-over syngas, water and $CO_2$. The $CO_2$ and/or other compounds may have to be removed from the tail gas, and the tail gas can be reintroduced into the engine, probably at pressure after the turbocharger.

In another embodiment, a combination of a liquid, such as water, and gaseous diluents may be used, such as with a conventional gas-assisted injector. In one case, passive diluents, instead of air, may be used to further promote atomization of the water. In another embodiment, the reactant oxygen may be used with the water injector to further enhance water atomization (at lower pressures) and also provide the oxygen required for combustion/syngas production.

Good efficient conversion of the natural gas in the engine 20 has been calculated using the methods described above, without the use of a catalyst, for equivalence ratios $\phi$ less than 4.

Illustrative calculations for HCCI operation in air and in oxygen are shown in FIGS. 1, 2 and 3. FIGS. 1 and 2 are calculated for $\phi=3$, while FIG. 3 is calculated for $\phi=3.4$. The chemical kinetics model used in these calculations is the 3.0 GRI mechanism model. The engine model used was the multi-zone CHEMKIN engine model, the engine was adiabatic (no heat exchange to the walls).

These calculations do not include the residuals in cylinder. It should also be noted that the pressures indicated in the illustrative figures are high. It is desirable to operate at lower peak-cylinder pressure, which can be accomplished by increased dilution, increased stratification of the temperature and oxidant/fuel concentration, decreased compression ratio, lower inlet manifold pressure or a combination of all the above. Although the calculations were performed at 1000 rpm, higher or lower speeds can be used. Varying the speed of operation is a means of controlling the rate of production of syngas. Alternatively, the engine can be operated at lower pressure, lower torque and lower BMEP (brake mean equivalence pressure).

Figure 1A:
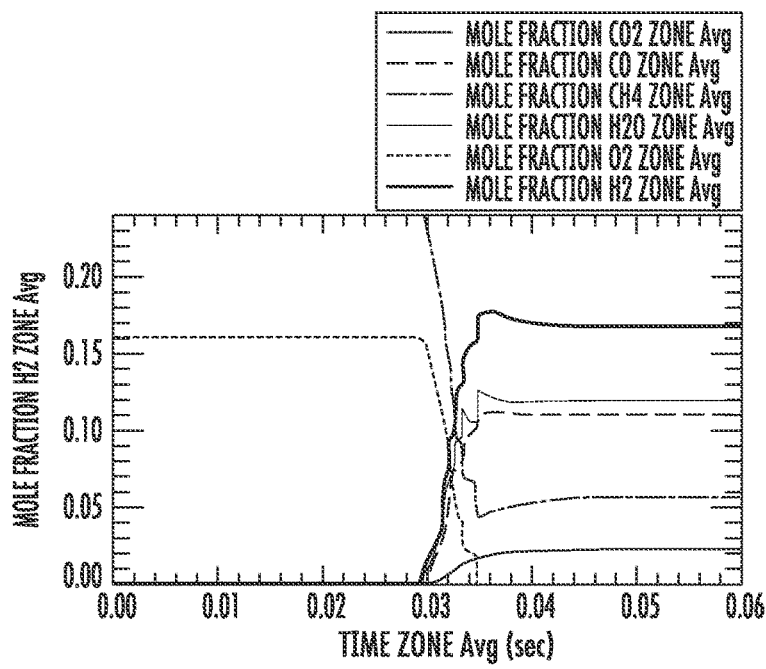
FIGS. 1A-C show multizone HCCI calculations according to one embodiment.
Figure 1B:
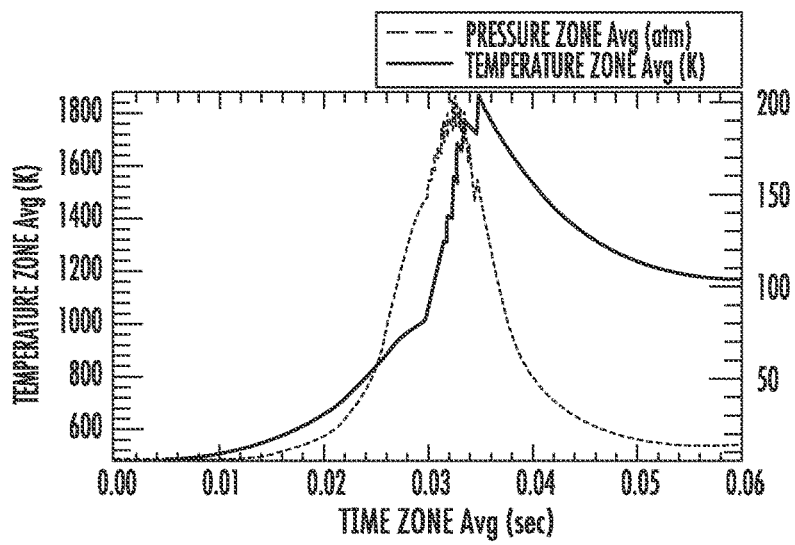
Figure 1C:
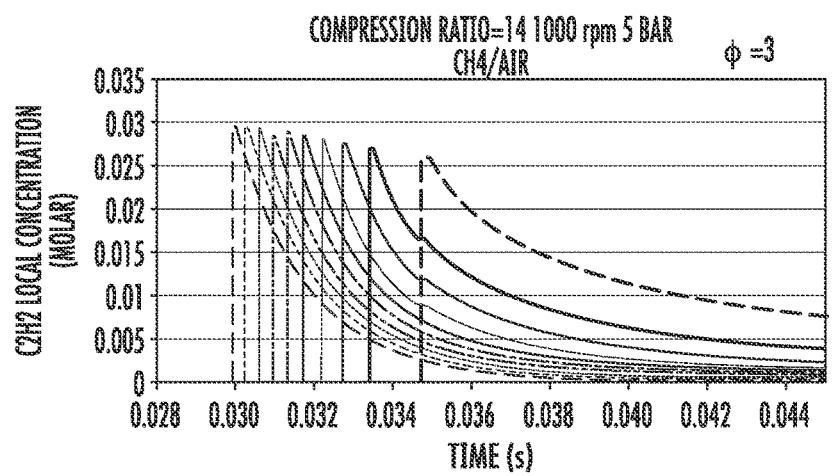

FIG. 1 shows multizone HCCI calculations under the following conditions: 1000 rpm, $\phi=3$, fuel 21 comprises methane, oxidant 22 comprises air, compression ratio of 14, 5 bar manifold pressure. FIG. 1A shows the mole fraction of the various gasses in the cylinder as a function of time. FIG. 1B shows the temperature and pressure within the cylinder as a function of time. FIG. 1C shows the local concentration of acetylene for 10 different regions of the cylinder. Acetylene is calculated as it is a precursor for soot formation. With the amounts of acetylene produced for brief "spikes", little, if any, soot formation is expected in the process.

Figure 2A:
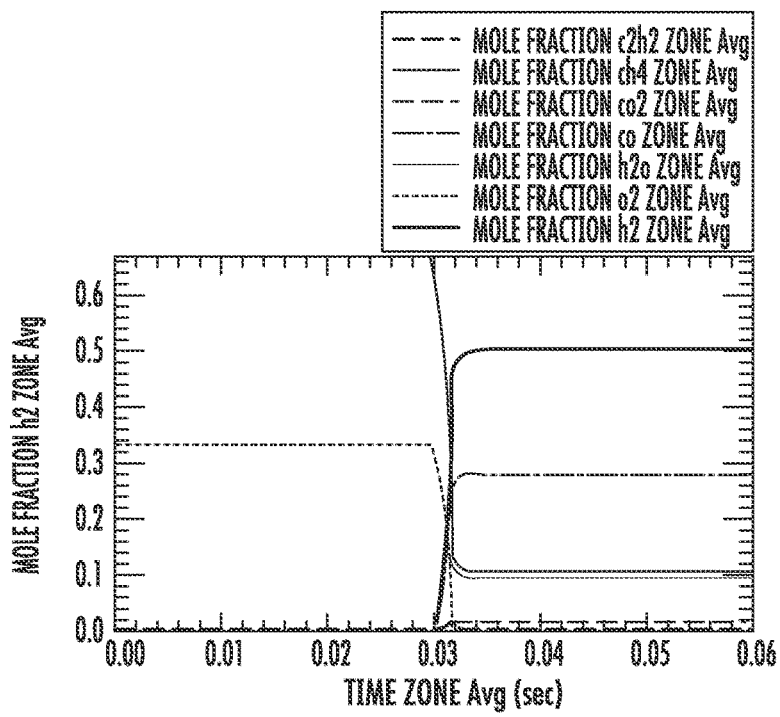
FIGS. 2A-C show multizone HCCI calculations according to another embodiment.
Figure 2B:
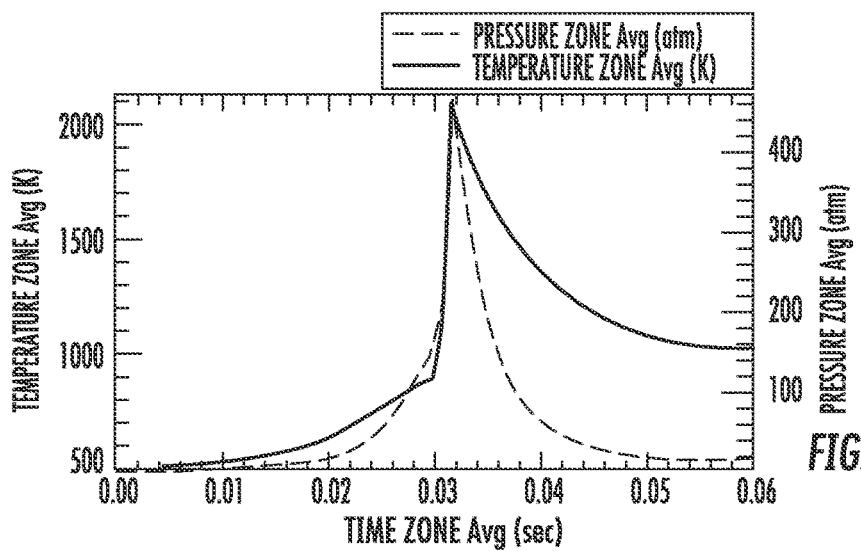
Figure 2C:
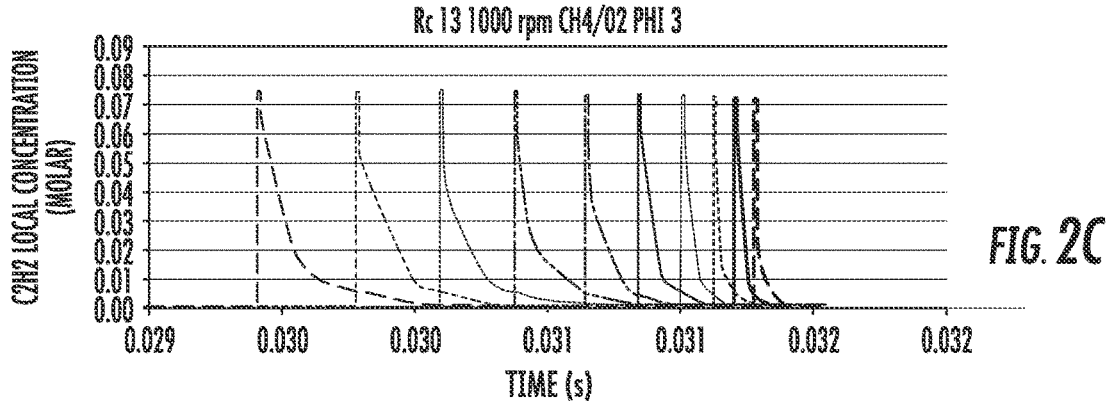

FIG. 2 shows calculations of multizone (10 zones) HCCI operation, for the following conditions: 1000 rpm, $\phi=3$, fuel 21 comprises methane, oxidant 22 comprises oxygen, with water added as a diluent, using compression ratio of 13, 5 bar manifold pressure. As described above, FIG. 2A shows the mole fraction of the various gasses in the cylinder as a function of time. FIG. 2B shows the temperature and pressure within the cylinder as a function of time. FIG. 2C shows the local concentration of acetylene for 10 different regions of the cylinder. It is noted that there is a spread in temperatures in the 10 zones, between 545 K and 653 K, however concentration across these zones is homogeneous. Also the acetylene spikes correspond to very quick process, resulting in very fast generation and consumption of the acetylene, with short duration to minimize the production of soot.

Figure 3A:
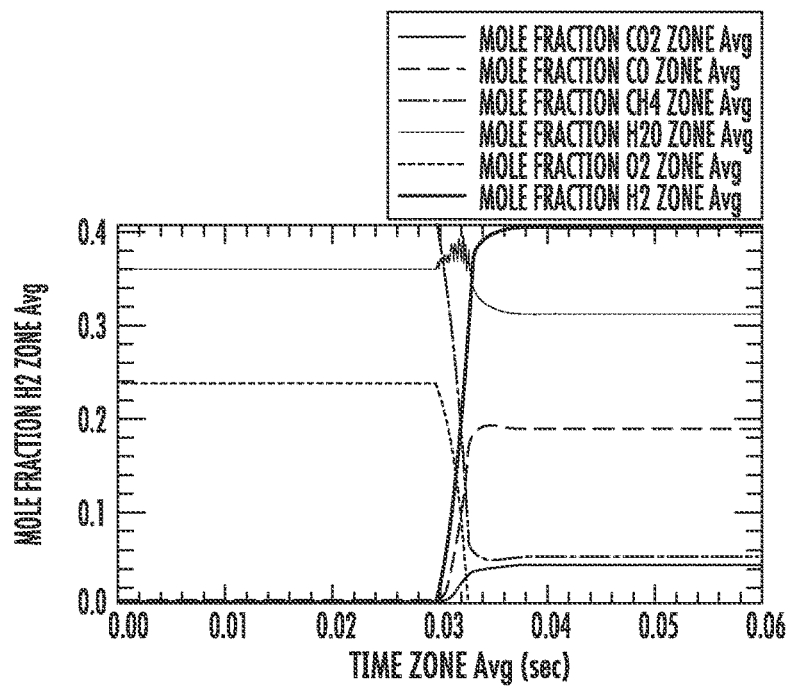
FIGS. 3A-C show multizone HCCI calculations according to another embodiment.
Figure 3B:
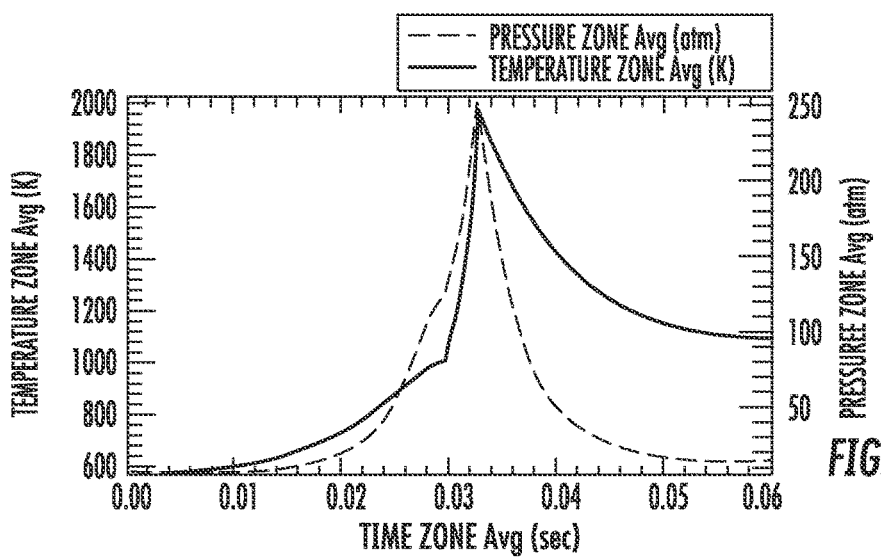
Figure 3C:
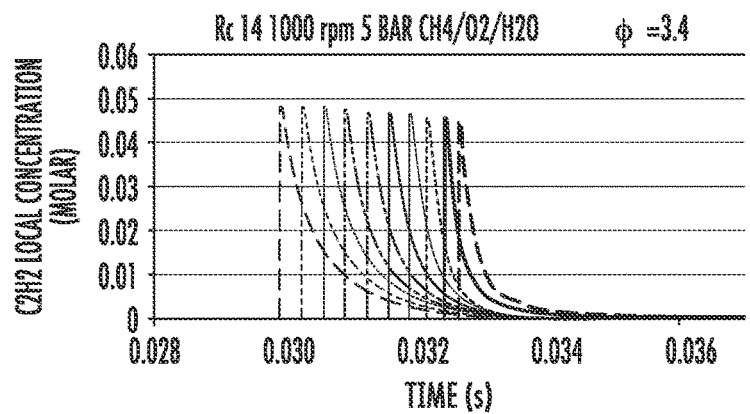

FIG. 3 shows calculation of multizone (10 zones) HCCI operation, under the following conditions: 1000 rpm, $\phi=3.4$, fuel 21 comprises methane, oxidant 22 comprises oxygen, water is added as a diluent in the ratio ($O_2/H_2O$:1/1.5), using a compression ratio of 14, 5 bar manifold pressure. As described above, FIG. 3A shows the mole fraction of the various gasses in the cylinder as a function of time. FIG. 3B shows the temperature and pressure within the cylinder as a function of time. FIG. 3C shows the local concentration of acetylene for 10 different regions of the cylinder. Note that there is a spread in temperatures in the 10 zones, between 545 K and 612 K, but concentration is homogeneous. Also the acetylene spikes correspond to very quick conversion, resulting in very fast generation and consumption of the acetylene.

The rate of pressure rise is controlled in the calculations in FIGS. 1-3 by thermal stratification, with uniform oxidant/fuel mixtures. The rate of pressure rise in this case is very high, and means are needed for decreasing both the peak pressure and the rate of pressure rise.

The exhaust pressures are high, corresponding to high inlet pressure. For FIG. 1 with HCCI, note that the pressure at bottom dead center (BDC) is ~15 bar. Thus, it is possible to exhaust the syngas at relatively high pressure, avoiding the use of some compressors.

Figure 19:
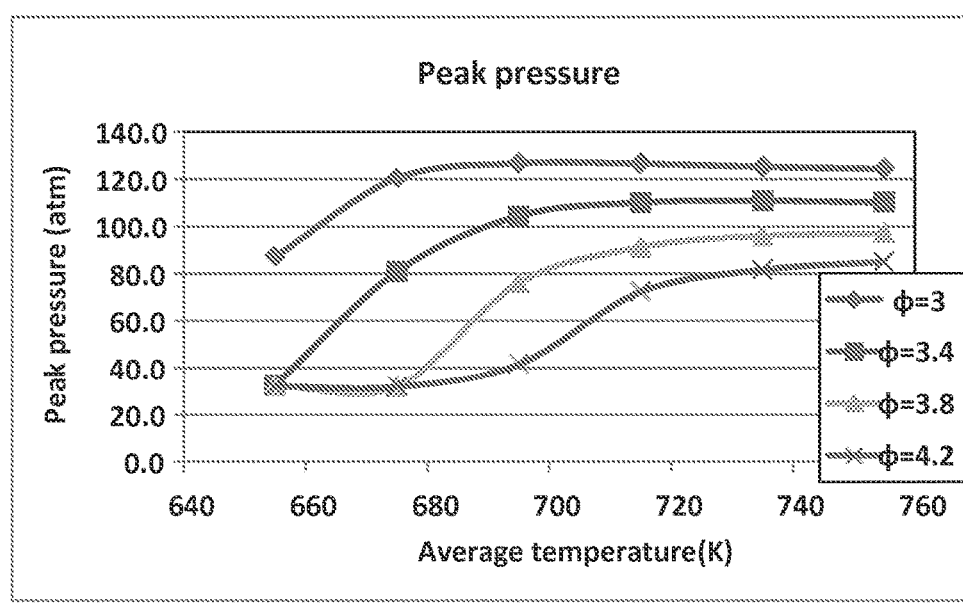
FIG. 19 shows the peak temperature in HCCI operation for 1 bar inlet manifold pressure as a function of the average in-cylinder temperature at inlet-valve closing, for several equivalence ratios.
Figure 20:
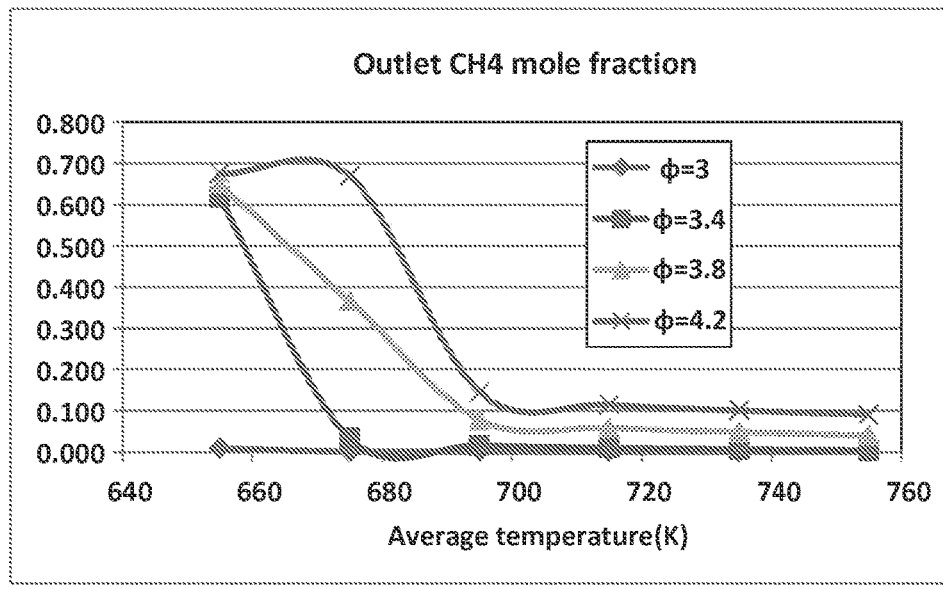
FIG. 20 shows the conversion of methane in the case of 1 bar inlet manifold pressure as a function of the in-cylinder average temperature at inlet valve closing, for several equivalence ratios.

The allowable window for operation of HCCI model was investigated parametrically. FIGS. 19 and 20 show the peak temperature and conversion of methane, respectively, in the case of 1 bar inlet manifold pressure, compression ratio of 19, operating at 1800 rpm as a function of the average in-cylinder temperature, for several equivalence ratios. The temperature indicated in the figures corresponds to the average temperature in the 10 zones, with a temperature spread of about 160 K, but ~80% of the fuel within a temperature spread of only 30 K. Good conversion occurs at an in-cylinder average temperature at time of inlet valve closing of about 700 K.

The results in these figures indicate that, when the temperatures are low, in the multi-zone model (as well as would happen in a stratified cylinder) one or more of the zones do not react. As a consequence, there is substantial unconverted methane. Increasing the temperature increases the rate of conversion and assures that all the zones react. Increasing the temperature spread decreases the rate of heat release (and thus the rate of pressure rise).

Figure 21:
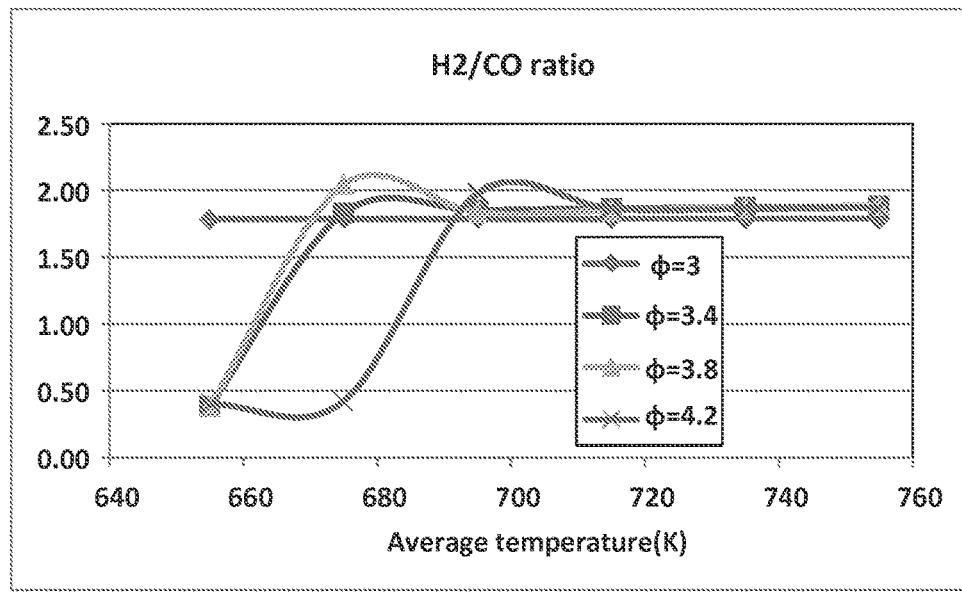
FIG. 21 shows the H$_2$/CO ratio of the syngas for the conditions of FIGS. 19-20.

FIG. 21 shows the $H_2/CO$ ratio for the conditions of FIGS. 19-20. The $H_2/CO$ ratio is slightly less than 2, indicating that some of the hydrogen has been converted to water, with less production of $CO_2$. As mentioned above, the chemical reactor 50 downstream from the engine reformer 20 prefers a $H_2/CO$ ratio near 2. The performance of the engine reformer 20 has been investigated in relation to adjustments in the composition of the syngas, through the injection of $H_2O$, $CO_2$ and $H_2$. It is most sensitivity to addition of $H_2$, which could be obtained from the tail gas or from other means from the engine reformer.

Figure 22:
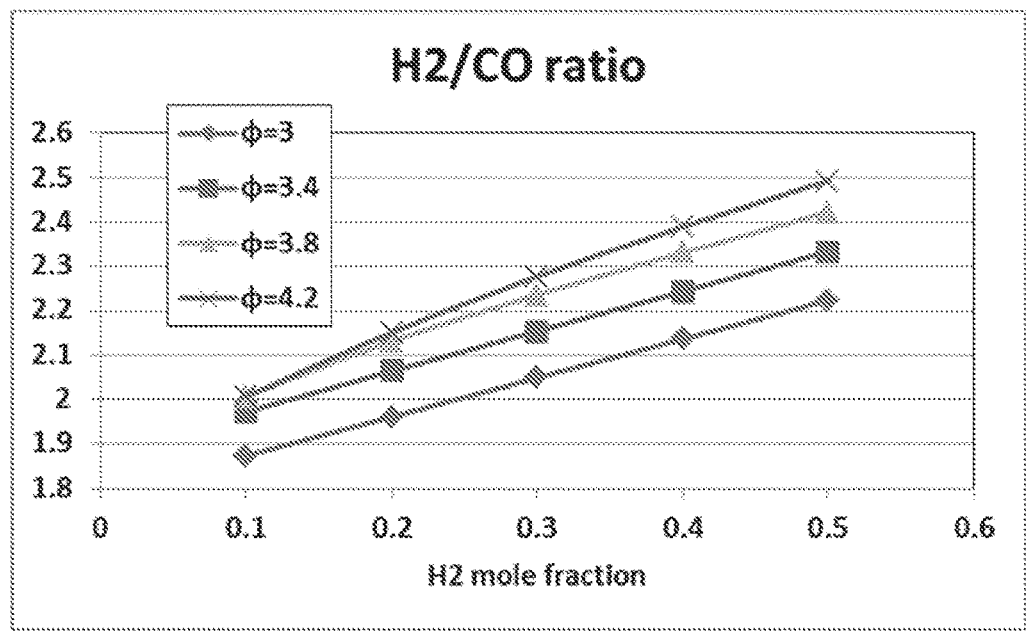
FIG. 22 shows the H$_2$/CO ratio of the syngas as a function of the H$_2$ concentration in the fuel for one engine operating condition.

FIG. 22 shows the $H_2/CO$ ratio as a function of the $H_2/CH_4$ concentration in the fuel for HCCI mode of operation, with ~690 K average temperature at time of inlet valve closing), with other conditions similar to FIGS. 19-20.

Figure 23:
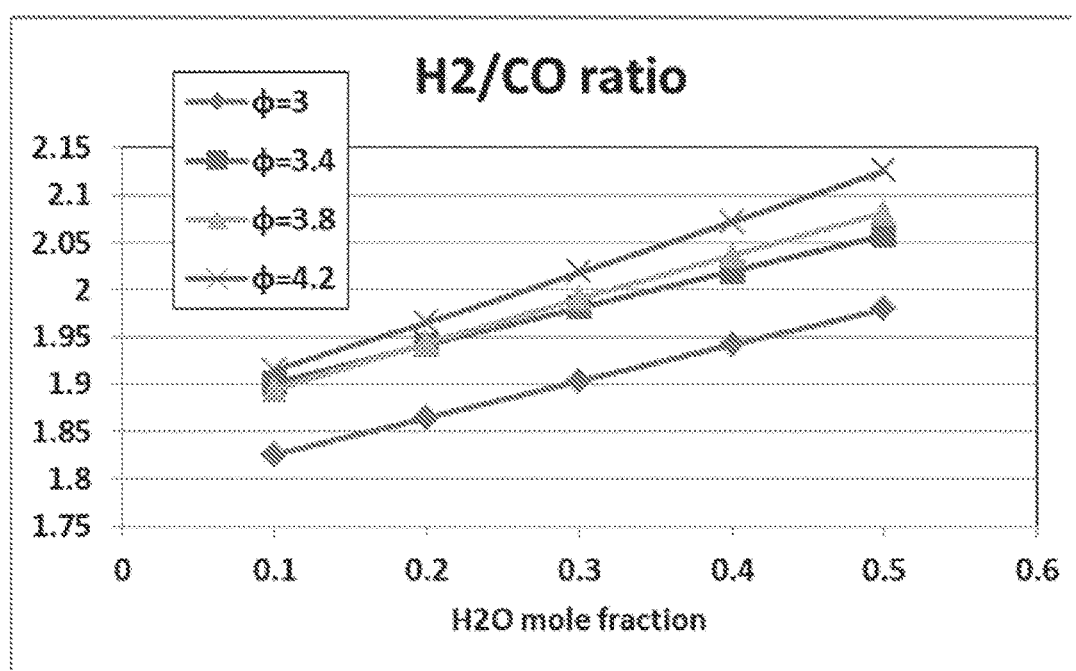
FIG. 23 shows the H$_2$/CO ratio of the syngas as a function of the H$_2$O concentration in the fuel for one engine operating condition.
Figure 24:
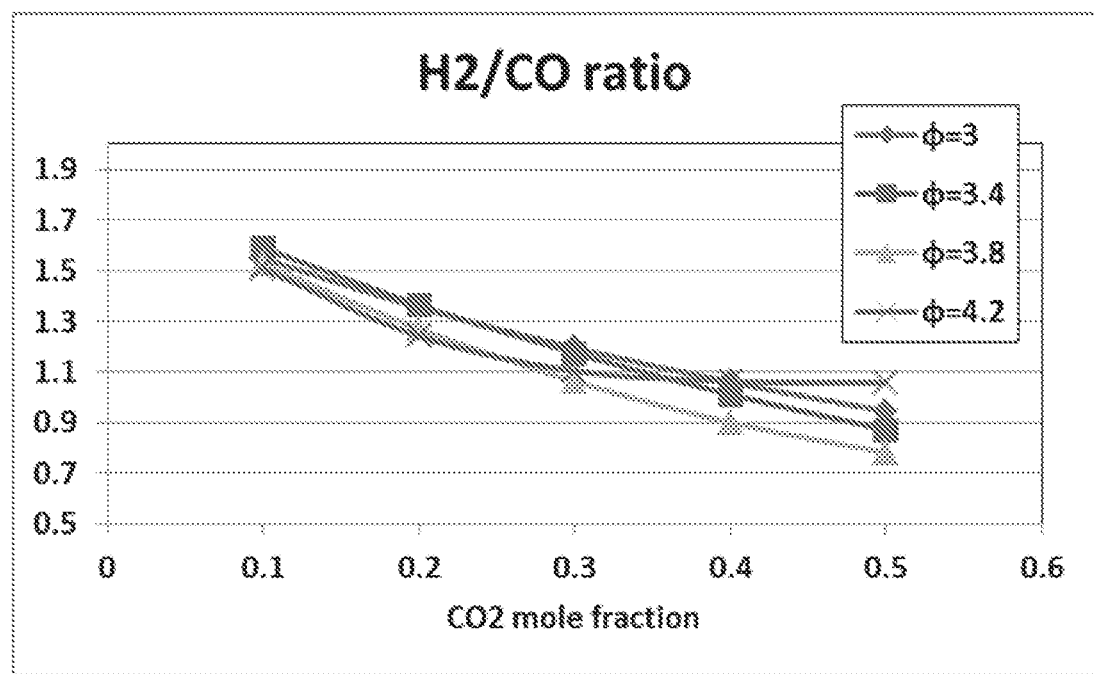
FIG. 24 shows the H$_2$/CO ratio as a function of the CO$_2$ concentration in the fuel for one engine operating condition.

FIG. 23 shows the $H_2/CO$ ratio as a function of the $H_2O/CH_4$ concentration in the fuel, where the other conditions are similar to FIG. 22. FIG. 24 shows the $H_2/CO$ ratio as a function of the $CO_2/CH_4$ concentration in the fuel, other conditions similar to FIG. 22. Clearly the $H_2/CO$ ratio can be adjusted by introducing additives: the $H_2/CO$ ratio can be increased by the introduction of $H_2$, $H_2O$ and decreased by the introduction of $CO_2$. Depending on the chemistry of the chemical reactor plant 50, it is possible to adjust the $H_2/CO$ ratio in the engine reformer 20.

Based on FIG. 2, observations may be made about the performance of an SI engine under these conditions, where flame propagation and retard would limit the rate of pressure rise and avoid knock altogether and reduce the peak pressure. Modeling SI operation, with turbulent flame speed, is very challenging. However, the overall chemistry in SI may not be very different from that obtained with HCCI, with reactions occurring at high pressures and varying temperatures. After peak pressure, the expansion processes are similar. In this case, the pressure at TDC is more ~20 bar, partly as a result of the larger relative increase in the number of moles when oxygen is the oxidant 22 (in the absence of nitrogen diluents).

It may be possible to use a Miller cycle (larger compression ratio in the expansion cycle than in the compression cycle), if lower pressures and temperatures during the exhaust cycle are desired. If only lower temperatures are desired, the excess energy can be used for preheating either the fuel 21 or oxidant 22, or the air to be used for the air separation unit (which may be part of the mechanical plant 60). For optimal function of the chemical reactor 50 downstream from the engine, pressures of tens of bar (20-30 bar) are desirable. It is straight forward to use a reciprocating engine, coupled with appropriate exhaust valve timing, to provide the required compression. This solution avoids the need of a separate compressor, and directly uses the engine power to drive the compression. However, it would be possible to drive a compressor using the mechanical energy generated by the rotating shaft 30, either directly, through gearing or through an electrical generator/electrical motor. Using the piston motion in-cylinder to compress the syngas results in a reduced number of components and substantial decrease in cost of the equipment. Opening the exhaust valve at the appropriate time can result in appropriate pressure in the exhaust. It may be necessary to adjust the timing, depending on the circumstances, and therefore, it may be beneficial to include the option of variable valve timing (VVT) of the exhaust valve opening/closing, through either hydraulic, mechanic or electrical means. For fixed operation (flow rate and fuel/oxidant composition), there may be no need of controlling the valve timing in the reforming cylinders. However, VVT would increase the flexibility of the engine in general.

Although at $\phi=3$, almost all of the methane is converted, at higher equivalence ratios, a substantial amount of methane is not converted. In the case of $\phi=4$ for similar engine conditions, the concentration of methane in the exhaust is above 10%, unless the temperatures are increased further, as shown in FIG. 20. This gas could be reintroduced into the engine with the oxidant, especially in the case of oxygen as the oxidant 22, after the removal of some compounds, such as $CO_2$ and/or water.

The in-cylinder temperatures at the time of inlet valve closing is substantially higher than required for HCCI operation with conventional (i.e., $\phi<1$) HCCI operation in air. It is necessary to cool the effluent from the fuel-making reactor, in order to separate the methanol. The excess heat may be used by the heat exchanger 70 to preheat the oxidant 22 or fuel 21, either upstream or downstream from the turbocharger. In some embodiments, the inlet temperatures required for HCCI may be higher than 650-700 K. Some of the preheat can be provided by adjusting the amount of residuals in the cylinder.

If substantially higher pressures of the syngas are required than those provided by the same cylinder where the syngas is manufactured, it may be better provided by using a different cylinder with different properties. The exhaust from one cylinder would be introduced into an inlet manifold for a second cylinder.

Figure 4A:
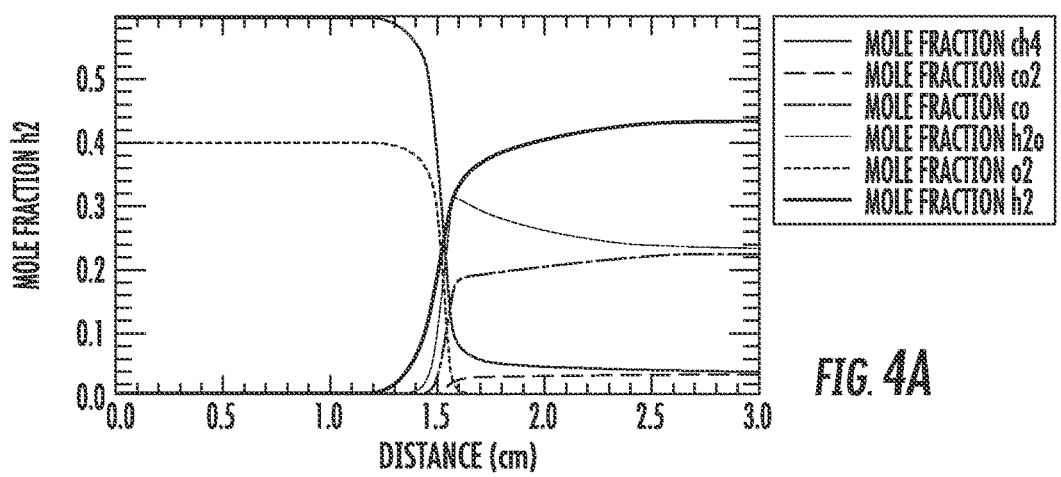
FIGS. 4A-C show calculation of flame propagation and $C_2$ concentration according to another embodiment.
Figure 4B:
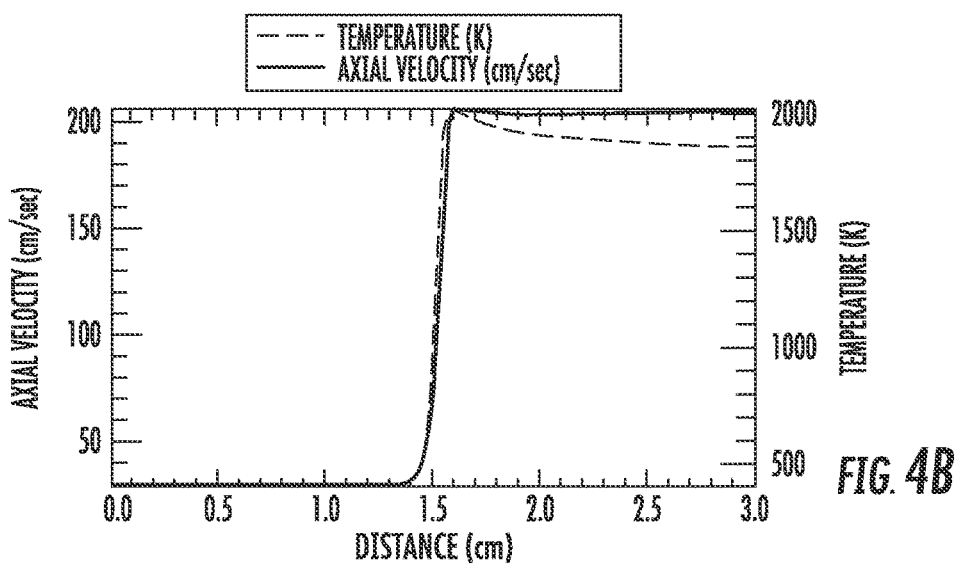
Figure 4C:
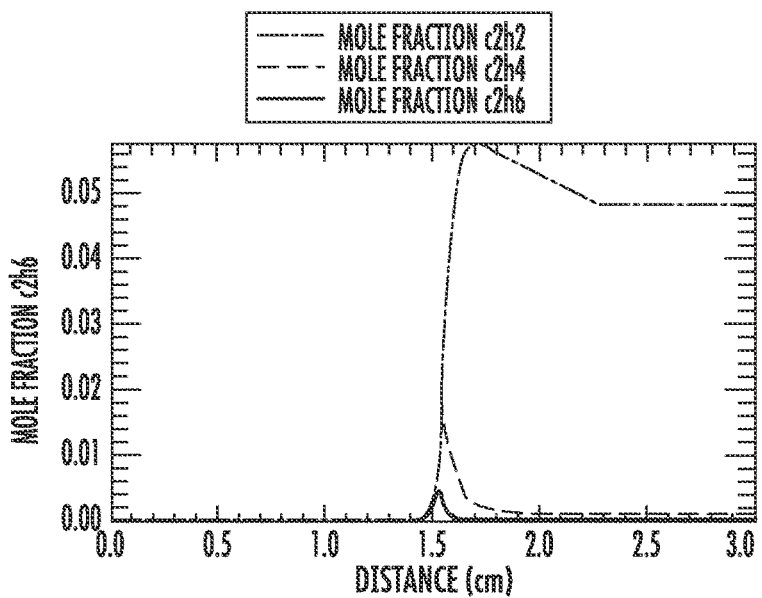

Rich operation can result in the formation of soot, especially with conventional fuels such as gasoline or diesel. In the case of methane, for soot formation to occur it is necessary to increase the carbon content in the fuel molecules, starting with formation of $C_2$ compounds. Although the formation of soot is still not well understood, the formation of the $C_2$ compounds is well understood and was investigated. FIGS. 4A-C show the concentration of reagents, the temperature and speed of the gases, and the concentration of $C_2$ compounds in the case of an atmospheric pressure flame, with an initial temperature of 400 K, using methane/oxygen mixtures, $\phi=3$. Specifically, FIG. 4A shows the mole fraction of the various gasses in the cylinder as a function of distance. FIG. 4B shows the temperature and axial velocity of the flame in the cylinder as a function of distance. FIG. 4C shows the concentration of various $C_2$ compounds.

Flame speed is about 30 cm/s, and peak temperatures are about 2000 K. The combustion zone is about 0.1 cm thick. The peak concentration of acetylene, which is a carbon precursor, is about 5%. This figure indicates that, in the case of atmospheric pressure combustion, it is likely that carbon will be created.

The engine reformer generation of soot was investigated through monitoring $C_2$ compounds, in particular $C_2H_2$, in the case of HCCI operation, as well as expected operation in SI engines, was studied. FIGS. 1C, 2C and 3C show the local concentration of acetylene as a function of time for various HCCI configurations. Acetylene is the $C_2$ compound with the highest concentration. There are 10 zones in the model, and the combustion of each zone is so fast that the concentration of acetylene is seen as spikes. In a continuous distribution of temperatures, the process will be smoother, although the local concentration at any one location is not expected to be above 5-6%. The duration of the acetylene spikes is about 500 microseconds.

Figure 5A:
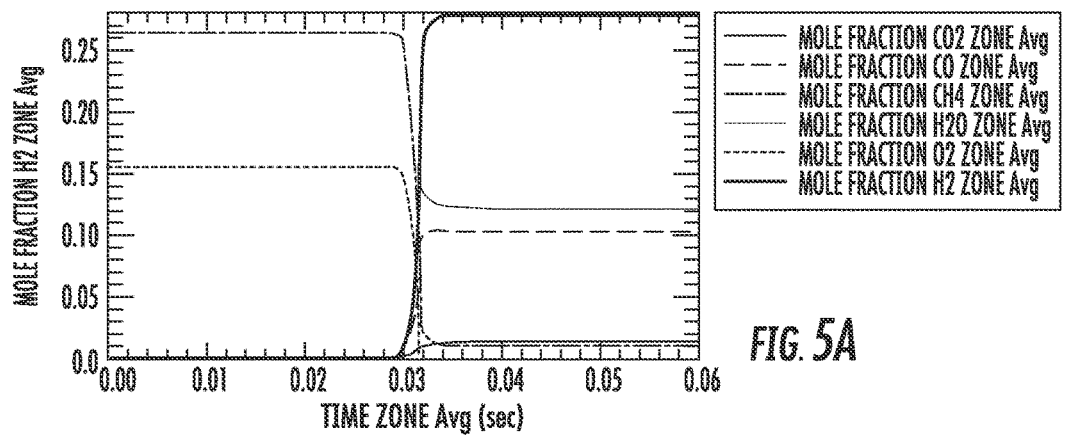
FIGS. 5A-C show multizone HCCI calculations according to another embodiment, including production and destruction of soot particles.
Figure 5B:
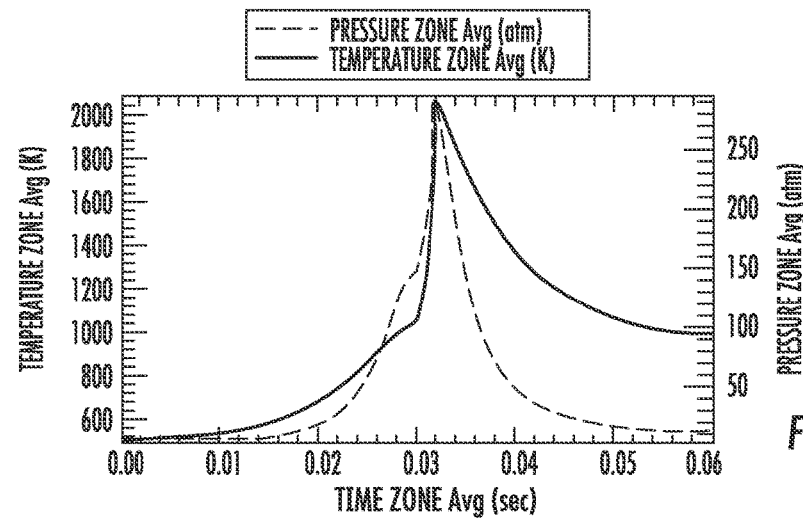
Figure 5C:
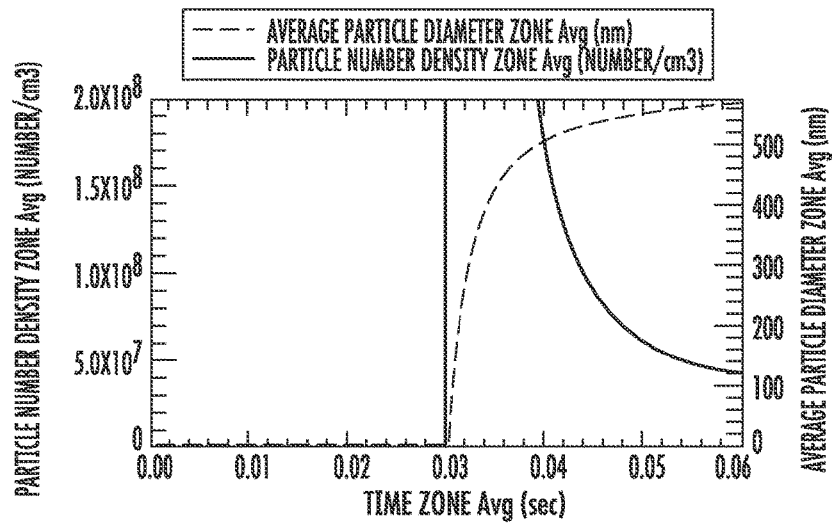

State-of-the-art models for calculating the soot formation were used. The formulation for particle tracking built into CHEMKIN has been used with a modified surface wall function. FIG. 5 shows the results, using the $H_2C_4$ reforming in air with a $C_2H_4$ chemical kinetics mechanism provided by CHEMKIN. Specifically, the conditions used were as follows: 1000 rpm, $\phi 3.4$, fuel 21 comprising methane, oxidant 22 comprising air, compression ratio of 14, 5 bar manifold pressure, with a temperature spread from 480 K-536 K. FIG. 5A shows the relative concentrations of the various gasses as a function of time. FIG. 5B shows the pressure and temperature within the cylinder as a function of time. FIG. 5C shows the particle density as a function of time.

Figure 6A:
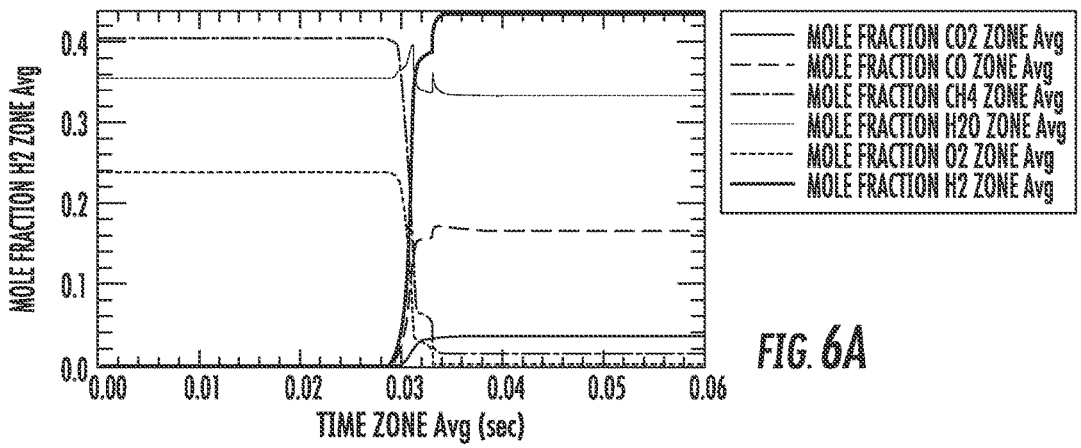
FIGS. 6A-C show multizone HCCI calculations according to another embodiment.
Figure 6B:
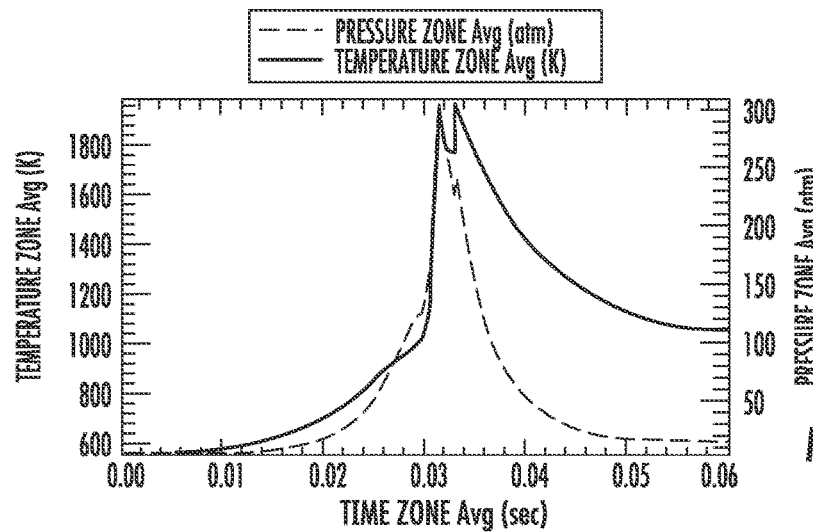
Figure 6C:
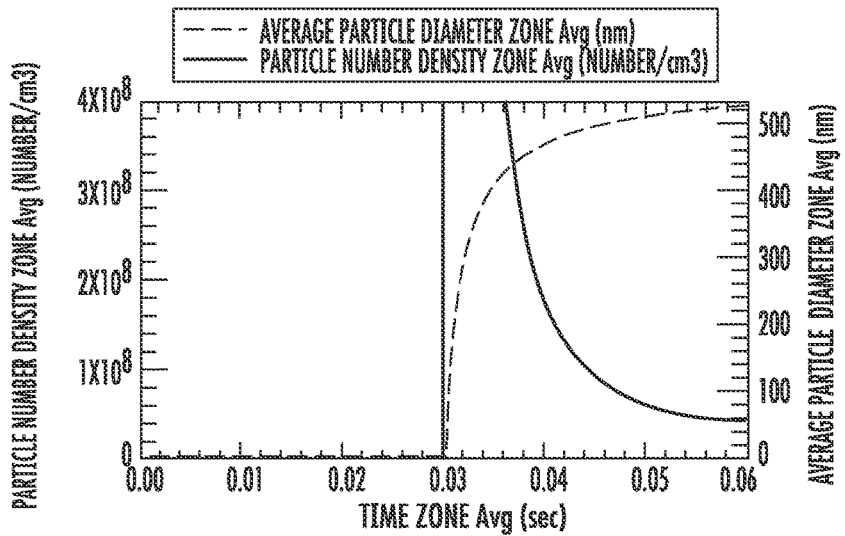

In this case, the peak pressure has been decreased from FIG. 1 through limited control of the temperature spread. Further decrease in peak pressure may be achievable by higher temperature spread, and/or diluent addition. FIGS. 6A-C show similar results for the following conditions: 1000 rpm, fuel 21 comprising methane, oxidant 22 comprising oxygen, with a compression ratio of 14, 5 bar manifold pressure, at $\phi=3.4$, with a temperature spread from 480 K-612 K.

The results indicate tolerable soot formation, both in the case of air and oxygen. If a modest amount of soot/particulates is generated, it may be possible to use a conventional soot trap, such as a diesel particulate filter (DPF) to trap the soot. It could be regenerated online, as in conventional DPF units. Because of the availability of oxygen in the plant, it may be possible to regenerate the DPF (offline) with oxygen, at very low flow rates, to minimize the temperature in the DPF due to the exothermic reaction. It would also be possible to use a catalyzed DPF, with injection of either water, oxygen, or air, in order to provide the oxygen required for gasifying the particulates. At low temperatures, catalytic oxidation of the soot via $NO/NO_2$ is also possible, depending on the engine feed gas and exhaust composition, provided sufficient levels of NO are present. Use of additional aftertreatment systems, such as an oxidation catalyst, may also be used to promote filter regeneration, depending on exhaust composition. Several types of DPF can be used. However, high temperature DPF's are preferred. Silicon carbide is used in some high temperature DPF's. In another embodiment, metallic filter elements may be used, which could also be electrically regenerated, even when the engine is off, or alternatively using electrical energy provided by a generator driven by the engine for example.

Alternatively, the calculations indicate that carbon particles with a mean diameter of about 500 nm are generated in the engine reformer 20. The black carbon could be collected and removed from the system, to be used in different processes or sold. The particle collection process could utilize conventional diesel particulate filters, electrostatic precipitators, filter bag houses, or other related means. However, because of the nature of the process, the carbon particulates could be either larger or smaller than 500 nm. The choice of the particulate control technology can be matched to the particulates that are being generated.

Substantial flexibility of operation of the engine, reformer and reformer system can be obtained by individual control of each cylinder of the engine 20. FIG. 7 shows the engine 20, having a plurality of cylinders 23, each having an inlet 24 and an outlet 25. The number of cylinders 23 is not limited by this disclosure. Some or all of the cylinders 23 may be driven using the same operating conditions. However, there is flexibility so that some or all of the cylinders 23 could be driven with different conditions. Individual control of each cylinder 23 includes means of adjustment the fuel/oxidant ratio, inlet manifold pressure, temperature and temperature gradients, valve timing (inlet and/or outlet), spark timing, addition of diluent, and even cylinder deactivation. In principle, it would also be useful to provide control in the exhaust manifold, such as through the use of valves 26, in order to provide either mixing of the outputs from cylinders 23, if they are operated at comparable conditions, or to keep these outputs separate. The control within the exhaust manifold is intended to include arbitrary mixing of the exhaust from each cylinder 23, or group of cylinders 23, through appropriate valving 26 of the cylinder exhaust. It would also be possible to change the engine displacement volume through cylinder deactivation.

In order to balance the engine 20 when operating with cylinders with different conditions, it may be useful to balance the engine by operating cylinders that are out of phase with the same operating conditions. Other procedures could be used for preventing the engine from running substantially out-of-balance when running with different conditions in the cylinders.

In addition to allowing control of the outlets 25, similar control may be provided at the inlets 24. Each inlet 24 may be separately valved to allow selection of various fuels 21 and oxidants 22. Thus, the engine system 20 is flexible enough to adjust to changes in fuel or oxidant on a cylinder by cylinder basis.

In particular, the high pressure in the inlet manifold can be a result of turbochargers or superchargers. A single unit or multiple turbo or super chargers can be considered. The turbocharger may operate on the exhaust from a single cylinder 23 or from a group of cylinders. It may also be possible to use a single turbocharger operating on the exhaust of a cylinder 23 or a group of cylinders 23, where the cylinders are operating under conditions that are adjusted for optimal performance of the turbocharger (turbocharger-dedicated cylinders). In the case of a turbocharger, the energy to drive the compression comes from the exhaust gas (syngas in this case), which differs substantially in composition from conventional turbochargers (much lower molecular weight). Thus, it may be useful to use a supercharger instead, using power generated by the engine 20 by the rotation of the shaft 30.

It may be advantageous to use the engine body from diesel engines, as they can tolerate high peak pressures. In order to provide long lifetime of the engine, operation at relatively low engine speeds, as is commonly done in heavy duty diesel engines used for power production, is preferable. Thus, the calculations illustrated in FIGS. 1 and 2 are for an engine speed of 1000 rpm. However, operating speeds from 500 rpm to 4000 rpm are possible. The high speed is possible because of the robustness of the ignition in SI mode, and the high speed of the process in low temperature combustion (HCCI, PCI or RCCI).

The engine speed can also be varied in order to adjust the rate of syngas production or electricity production.

Different engine geometries can be considered: in-line, V-configuration, rotary piston engines and others. In the case of V-engine configuration, the cylinders on one V can have either different air/fuel ratio, different diluents, different valve timing, different spark timing, different inlet manifold pressure, or a combination of some or all of the above, with respect to the cylinders on the other bank of cylinders of the V.

Although the concept of integrating the engine and the compressor in the same engine has increased flexibility in a 4-cycle engine, a 2-cycle engine or even a 6-cycle cycle can also be used with this concept. However, means of increasing the scavenging would be needed for using a 2 cycle engine for this application, as the exhaust pressure may be high.

Scavenging of the syngas is important, as substantial residuals will be present because the exhaust operates at high pressure. Means of increasing the scavenging are needed. Some of the techniques that could be used for increasing the scavenging would be to inject tail gas near TDC (Top-Dead-Center) during the exhaust stroke. Alternatively, injecting water or steam in the compression stroke towards TDC could be used, as water may be needed in order to provide some dilution, especially for the case of oxygen-methane combustion. In this case, the steam is used to push the syngas components out of the cylinder. The water could be injected as liquid, and vaporizing either in the cylinder, or after hitting a surface, such as the top piston. The water could be used to cool the syngas also, as the temperature of the syngas is higher than that required by the chemical reactor 50. Finally, the volume at TDC can be minimized, either by variable compression ratio so that the volume at TDC in the exhaust stroke is minimized. A separate exhaust valve could be used to release some of the syngas at lower pressure, for use elsewhere in the system, for example, to provide additional hydrogen to adjust the $H_2/CO$ ratio in the reformate. Alternatively, the pressure in the exhaust manifold can be reduced altogether, which would require the presence of a larger compressor in order to provide the pressures required by the chemical reactor 50 downstream from the engine reformer. A combination of these techniques could be used. Ideally, some of the substance injected does not mix with the syngas, and it is used to displace the syngas out of the cylinder 23 while the exhaust valve is open, scavenging the syngas.

In the case of liquid or gas injection to reduce the residuals in the cylinder, it may be desirable to release the pressure in the cylinder after the syngas exhaust valve has closed. This could the achieved by opening a different second exhaust valve, such as a scavenger substance exhaust valve, that exhausts to lower pressure while the cylinder is near top-dead center (i.e., minimum volume). It is possible that the scavenger substance exhaust valve is open at the same time as the inlet valve is open, and the charge flowing from the inlet valve pushes the scavenger substance out of the cylinder through the scavenger substance exhaust valve. It may be possible to allow some of the charge through the inlet valve to escape through the scavenger substance exhaust valve.

It is interesting to note that if the exhaust valve has not opened during the liquid injection, the temperature of the syngas can be decreased. Relatively low power is required for the compression, as the substance is compressed while liquid. Indeed, lower temperatures are preferred by today's highly selective methanol catalysts.

In other embodiments, a 6-cycle engine is used, adding up an additional expansion and exhaust cycles to the conventional 4 cycle engine. In this case, after injection of the scavenger substance, the exhaust valve closes, there is an expansion cycle (power cycle), after which the scavenger substance exhaust valve opens. The scavenger substance is exhausted at low pressure, minimizing the residual mass at top-dead-center when the volume is minimal. The scavenging substance valve closes and the inlet valve opens (potentially with some overlap).

Thus, scavenging techniques include adding additional cycles to the engine 20, exhausting the residual gas through another exhaust port, in communication with a low pressure source, or injecting a scavenger substance in the cylinder 23 to force the residual syngas to exit through the open exhaust valve.

The equivalence ratio $\phi$ for reforming in engine could be from about 2.5 to 4. In flowing burner flames as well as in cylinder calculations, lower equivalence ratios result in higher energy released in the conversion, higher peak in-cylinder temperatures, lower selectivity to hydrogen and CO lower concentrations of $C_2H_2$.

In some embodiments, it is possible to use an autoignition additive to the fuel/oxidant mixtures, to ease the conditions required for autoignition. Because of the high auto-ignition properties of certain fuels, such as methane, it is necessary to use very high temperatures and pressures to achieve autoignition, and then very high combustion rates after autoignition. Therefore, the use of an ignition additive could be beneficial. DME is an example of an ignition additive that can be used. DME can be easily manufactured from methanol, and indeed it may be generated in less selective methanol catalysts. DME can be created from methanol through de-hydration. For example, if chemical reactor 50 produces methanol, DME may be produced onsite.

The ignition additive can be premixed with the fuel/oxidant mixture, or directly injected into the cylinder. Thermal and composition stratification can be used to reduce the rate of heat release.

Although the calculations in FIGS. 1 and 2 have been prepared based on methane, any type of hydrocarbon fuel that can be introduced into an engine could be used: natural gas, as in a pipeline, natural gas from shale production, natural gas from oil rigs, biogas from landfills and digesters, or liquid fuels that can be introduced into the engine and do not impair engine operation.

The engine 20 may be controlled using numerous control strategies and methods. A controller (not shown) having a processing unit in communication with a memory device, comprising instructions, may be used. These instructions, when executed by the processing unit, allow the controller to perform the monitoring and control functions described herein.

In one embodiment, measurements from a combination of intake air flow meters and fuel flow meters may be used to regulate the engine's oxidant:fuel ratio. Downstream (exhaust) measurements of gaseous emissions, particularly $H_2$ and CO, but also $CO_2$, unburned hydrocarbons, and $H_2O$ can also be used to regulate/modify the operation of the engine and the syngas generation system. Exhaust soot sensors or RF-based DPF sensors may also be used to monitor soot emissions. In-cylinder pressure and exhaust temperature and pressure measurements may also be used.

Outputs from the sensors and transducers described above may be used to optimize and control engine operation for a variety of objectives, such as to maximize the production of syngas in one example, or for the regulation of exhaust pressure, or to suppress or increase the production of soot emissions (when RF or soot sensors are used). In-cylinder pressure sensors may also be used to provide real-time combustion feedback control. In another case, it may be desirable to optimize the combined syngas production and power generation system to provide maximum syngas output at a required engine power level, when the engine is required to drive auxiliary devices.

Open and closed loop control strategies may be employed. The control may be based on measured values and look-up tables, or feedback control from one or more of the sensors described above. The control system may further be optimized for a specific fuel or fuel quality.

Multiple sensors can be used when different cylinders in the engine are used for different processes. Thus, it would be possible to run one or more cylinders with stoichiometric methane, for engine control, some for manufacturing of syngas, some for compressing/expanding air for an Air Separation Unit, which is described in greater detail below. Knock, mass flow rate (gas, liquids), temperature, ignition timing, exhaust sensors and others can be used to control the engine.

Control of emissions can be achieved by removing compounds either upstream from the engine, downstream from the engine but upstream from the catalyst or downstream from the catalyst. In particular, sulfur can be removed at low temperature upstream from the engine, removed hot downstream from the engine but upstream from the catalyst, or downstream from the catalyst, either hot or cold. Some methanol or FT catalysts are sensitive to sulfur, and thus they need to be removed upstream from the catalyst, most likely upstream from the engine reformer 20.

To summarize, the engine reformer 20 is an engine having a plurality of reciprocating pistons, each disposed in a cylinder. The walls of the cylinder and the piston head form a combustion chamber. A fuel 21 and an oxidant 22 are introduced into the cylinder. This can be done by mixing the fuel and oxidant mixture together and feeding it from an inlet manifold to the cylinder. Alternatively, one or both of these components may be directly injected into the cylinder. The fuel and oxidant are mixed in a ratio of $2.5<\phi<4$. The oxidant 22 can be oxygen or air, while the fuel can be any hydrocarbon fuel, such as methane, natural gas or biogas.

The fuel 21 and oxidant 22 are then partially combusted to create syngas. In one embodiment, a spark ignition system is used, where a spark is generated in the cylinder before or near TDC. This may be performed using a conventional spark plug, or advanced sparking techniques, such as high power spark systems, multiple discharge sparks, or "diesel-like" sparking. In some embodiments, a pre-combustion chamber is used to create the flame which enters the cylinder.

In other embodiments, low temperature combustion, such as HCCI or PCI are used to partially combust the fuel and the oxidant. Additives, such as DME can be used to aid in the autoignition.

In some embodiments, the compression ratio is between 12 and 15. Increased pressure in the manifold may be achieved using a turbocharger or supercharger. The compression may be controlled by the opening and closing of the exhaust valves, which may utilize VVT. The compression may also be controlled by the temperature and pressure at the inlet manifold.

In some embodiments, a diluent, such as argon, nitrogen, alcohol, cool syngas, tail gas or water, may be used to control the temperature, pressure or rate of pressure rise achieved with the cylinder. Specifically, in some embodiment, water is directly injected into the cylinder to control the heat release rate and the peak pressure.

In some embodiments, the heat generated by the exothermal reaction within the cylinders 23 is extracted using a heat exchanger 70 in communication with the exhaust of the engine 20. In some embodiments, the hot syngas is used to pre-heat the hydrocarbon fuel 21 or the oxidant 22 prior to introduction to the engine 20. It may be desirable to have compact heat exchangers, especially when size is at a premium, such as GTL systems on a skid or a barge. Efficient, compact heat exchangers using microchannel techniques or using open-cell porous foam metals can be used.

The engine 20 may include a plurality of cylinders, where each cylinder or group of cylinders is operated at a particular set of operating parameters.

A controller 90 may use a plurality of sensors to monitor the operation of the engine 20. Based on these sensor readings, the controller 90 may control operation of the engine 20 to optimize syngas production, minimize exhausts, minimize soot generation, or for some other function.

Furthermore, the partial combustion of the fuel and oxidant also produces mechanical energy, in that the heat generated forces the piston downward, which causes the shaft 30 to rotate.

As described above, the output of the engine reformer 20 is preferably syngas, which is a mixture of hydrogen and carbon monoxide. Using syngas, the chemical reactor 50 can be used to produce various different output fuels, such as methanol. In addition to methanol there are ethanol/mixed alcohols, FT fuels, DME, and other liquids or chemical compounds of higher value than the starting hydrocarbon fuel 21.

FIG. 13 shows that the rotating shaft 30 from the engine 20 may supply power to a mechanical power plant 60. Since the engine considered for the process may be a conventional engine for a vehicle, it would be possible to utilize the transmission already developed for this engine/vehicle as a gear box. Because these transmissions are very well engineered and mass produced, the cost of the transmission would be substantially smaller than the cost of customized gear boxes, further minimizing the cost of the system.

As mentioned above, either air or oxygen can be used as the oxidant. However, in some embodiments, oxygen may be the preferred method for the manufacturing of syngas best tailored for the manufacturing of liquids (methanol, ethanol, mixed alcohols, FT, or other liquids). Oxygen may be generated in a variety of ways.

Figure 8:
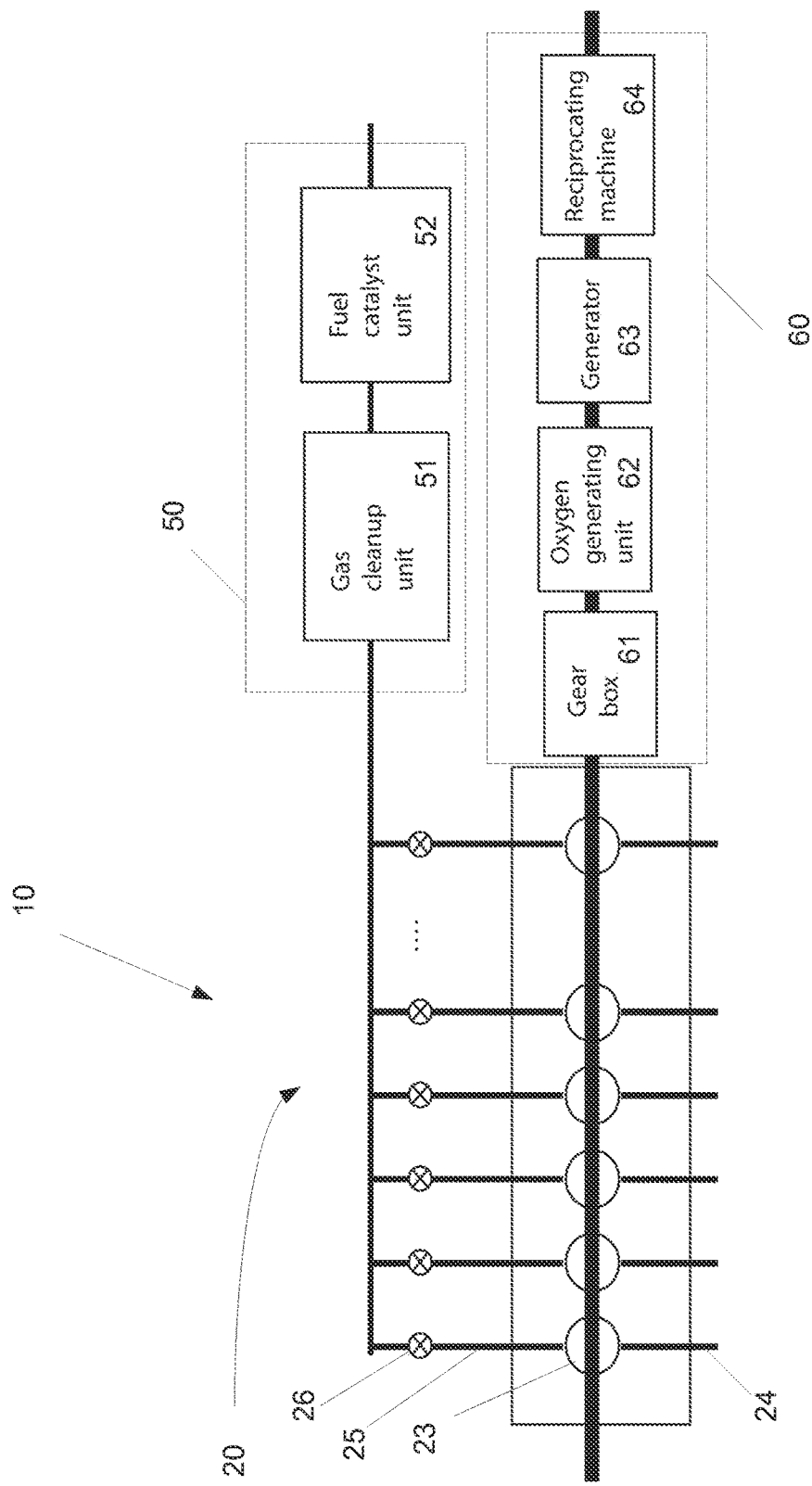
FIG. 8 shows various components that may be part of the mechanical power plant according to one embodiment.

FIG. 8 shows a system 10, having a mechanical power plant 60 that includes a gear box 61, an oxygen generating unit 62, a generator 63 and a second reciprocating machine or engine 64 with different displacement per cylinder. Not all these units need to be present. This approach may be more practical than using a single engine with different displacements. However, an engine can be modified in order to provide some cylinders with different geometries. In addition, it is possible to have varying compression ratio between the cylinders of the engine, through replacement of the cylinder lining and the piston. In some embodiments, the second reciprocating engine 64 may be used as a compressor to increase the pressure of a gas, such as the hydrocarbon fuel 21, the oxidant 22, or the produced syngas 40. It may also be used for compression of air for the oxygen generating unit 62, or it may be used to generate the vacuum required in a vacuum-assisted pressure swing absorption air-separation unit.

Air separation requires bringing the air to high pressure. Although FIG. 8 shows the same cylinder doing the compression and the expansion of the air, this is not necessarily required. It is possible to do the compression on one cylinder, remove either heat or compounds from the air, and expand it in a different cylinder, adjusted for the change in temperature and pressure. This provides a means of recovering the energy used to pressurize the air, expanding the oxygen depleted air through the cylinders.

Figure 9:
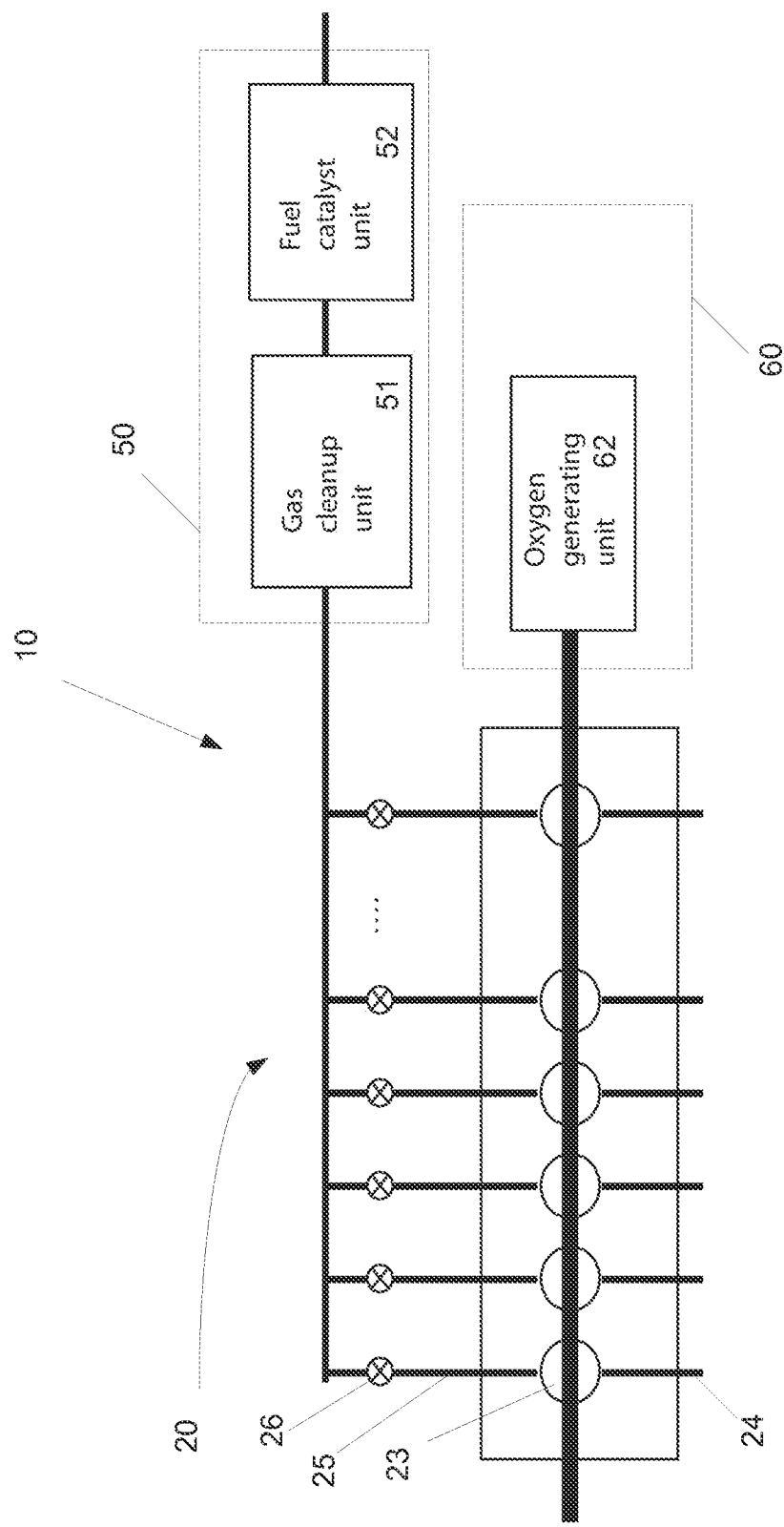
FIG. 9 shows a reformer system according to another embodiment.

FIG. 9 shows a schematic of the reformer system 10 according to another embodiment. The oxygen producing unit 62 can be attached to the shaft 30 (through gearing) as shown in FIG. 8. Alternatively, it can operate using electrical power produced by the engine 20. Both options are described below.

In some embodiments, the source of the oxygen may be an Air Separating Unit (ASU) connected directly or through gearing to the engine 20, The ASU would use some of the engine mechanical power for operation. This option would eliminate the need for a generator and a motor. However, substantial unit size may be required.

Figure 10:
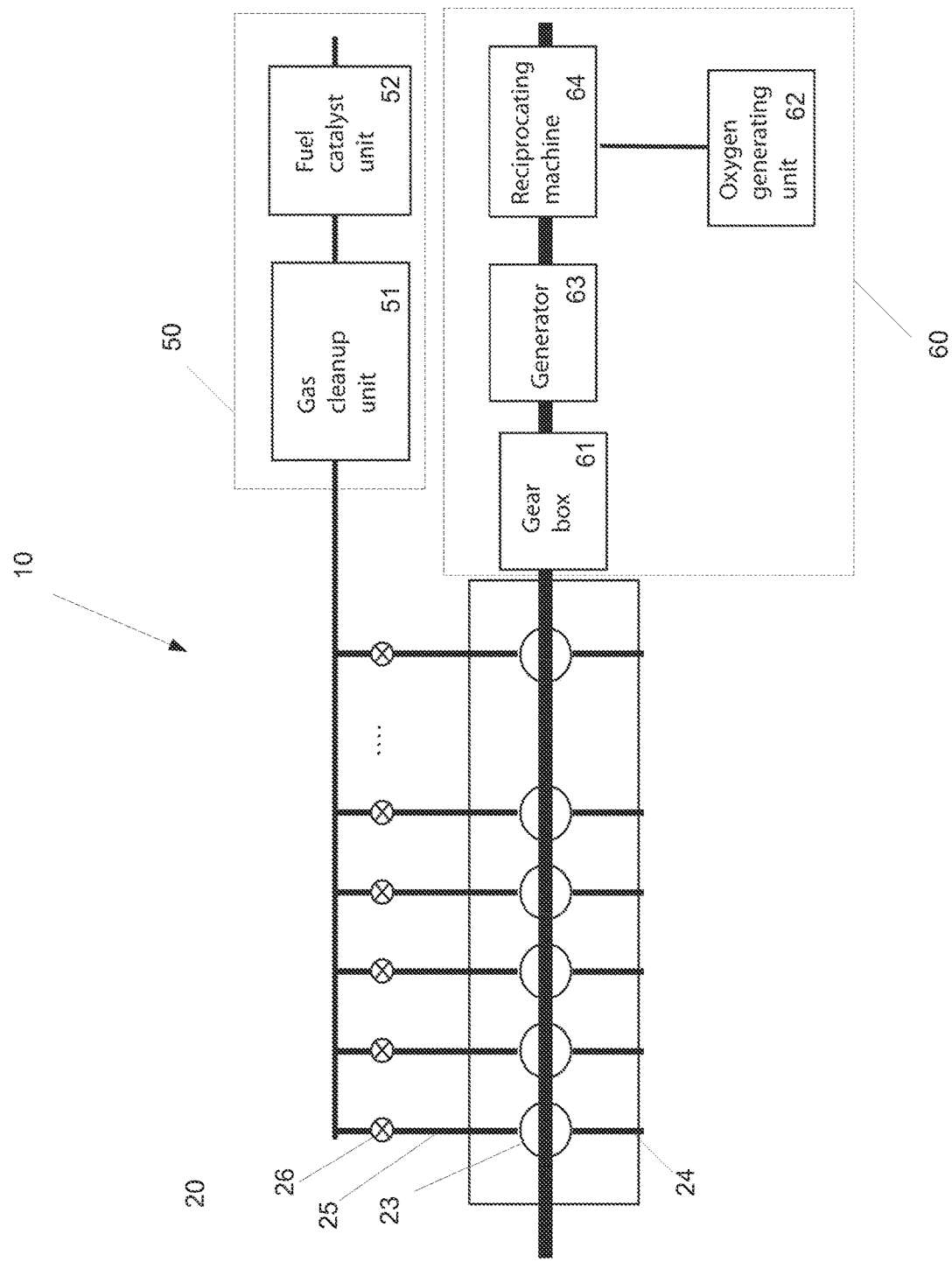
FIG. 10 shows a reformer system according to another embodiment.

Because of proprietary reasons, characteristics of air separation units are difficult to find. Smith el al. provided some information, shown in Table 2, about the requirements for a 5000 BPDOE (barrel per day oil equivalent) fuel manufacturing plant. These numbers have been scaled down, with the assumption of constant specific power consumption, most likely not the case for the cryogenic plant but probably adequate for the pressure swing absorption plant. The power requirement to produce the oxygen required for a 100 BPDOE plant is about 250 kW. The engine 20 described herein (using a 15 liter engine) that produced 100 BPDOE generates power of 500 kW, so the power generated without additional combusting of the fuel is adequate to drive the air separation unit. In the case of the pressure swing absorption, it would be possible to use reciprocating vacuum pumps/compressor 64, which is driven mechanically by the engine, as shown in FIG. 10.

TABLE 2

Characteristics of the ASU ($\phi$~3) Smith el al.

|  |  | Cryogenic | PSA | Cryogenic | PSA |
|---|---|---|---|---|---|
| Fuel produced | bpd oe | 5000 | 5000 | 100 | 100 |
| Oxygen consumption | ton/day | 890 | 890 | 17.8 | 17.8 |
| Electric power | MW | 12.5 | 10.5 | 0.25 | 0.21 |
| Specific electric power requirement | kW hr/ton | 337 | 283 |  |  |

It would also be possible to use air separation units that are membrane based. In this case, it may be possible to use one or more cylinders for compression of the air, with the oxygen depleted air expanded in the cylinders and thus recapturing some of the compression energy. FIG. 10 shows a schematic of the system, with the air compressor 62 being driven by the engine 64. The reciprocating machine 64 provides the high pressure (for membrane separation air needed for generating the oxygen, or the high pressure/vacuum needed for pressure swing absorption). The compressor is, then, one or more of the engine cylinders, with high compression ratio, further eliminating components. The separation would occur in a chamber connected to the exhaust of the cylinder, and then the compressed, oxygen depleted air would be uncompressed in either the same or another cylinder, allowing for recovery of some of the compression energy. The chamber would have separate inlet/outlets, and would produce a substantial residence time for adequate oxygen separation. Substantial amounts of air need to be moved to produce the oxygen, as only a small fraction of the oxygen is removed in the system, and thus efficient compression/decompression would be ideal. The timing of valves can be used for controlling the exhaust of the compressed air and the inlet of the oxygen depleted air into the cylinder.

It should be mentioned that pure oxygen is not necessarily needed. It may be desirable to decrease the amount of nitrogen, but high oxygen purity is not needed. Thus, in the case of the membranes, membranes that have more throughput, but are less selective, could be used. In addition, it would not be necessary to use multiple stages in the oxygen generation system.

Figure 11:
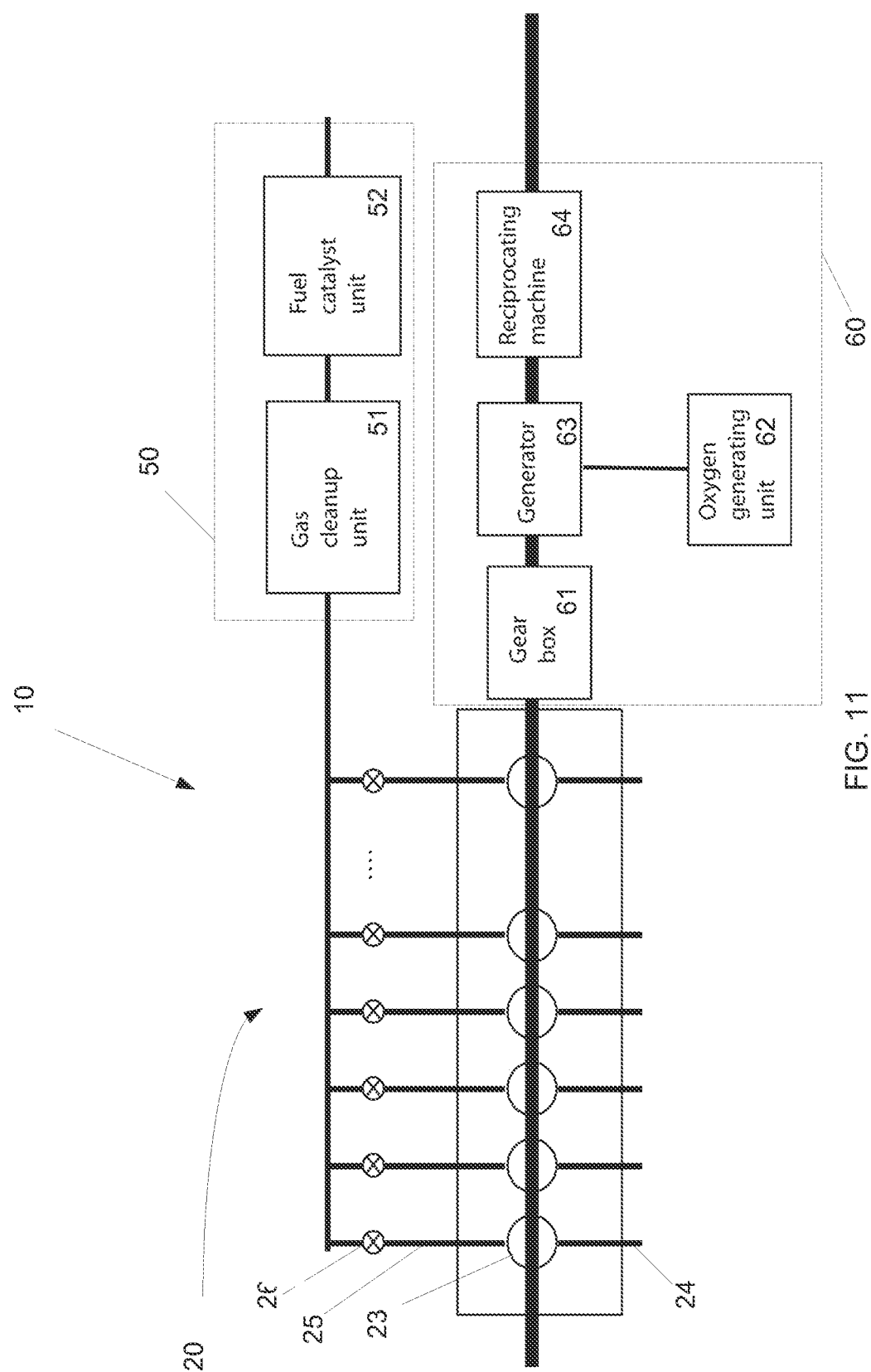
FIG. 11 shows a reformer system according to another embodiment.

There is a third option that can be used for the generation of oxygen, which uses water-splitting. Either a straight electrolyzer, or a reverse fuel cell that splits water, could be used. FIG. 11 shows a schematic of the system 10 where a generator 63 is coupled to the shaft 30 to provide electricity to drive the oxygen generating unit 62. The oxygen generating unit 62 may be an electrolyzer or a solid oxide fuel cell (SOFC) operating in reverse polarity.

Figure 12:
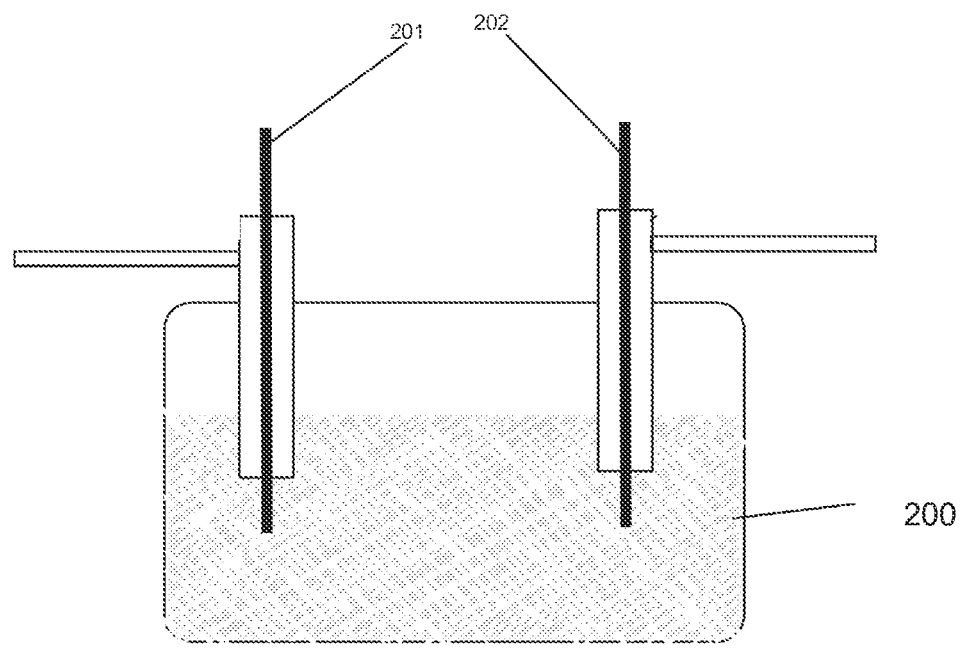
FIG. 12 illustrates an electrolyzer for the generation of $O_2$ and $H_2$.

FIG. 12 shows a schematic of an electrolyzer 200 that can be used with the embodiment of FIG. 11. In this case, relatively high oxygen purity is obtained. The power required to drive the electrolyzer 200 can be generated by the engine 20, using the excess mechanical power of the engine coupled to an electricity generator 63, as shown in FIG. 11. Electrodes 201, 202 are placed in a source of water. Hydrogen is attracted to the positive electrode 202, while oxygen is attracted to the negative electrode 201. These gasses are collected near their respective electrodes 201, 202. The oxygen can be used in the engine 20 for reformation, while the hydrogen can be added to the syngas, which is supplied to the chemical reactor 50. This may be very useful when the syngas generated has a deficit of hydrogen for generation of the liquid fuels (for example, landfill gas). Ideally, the hydrogen/oxygen would be generated at pressure, eliminating the need for compressing the gases (in the case of oxygen, to be introduced into the engine 20, in the case of the hydrogen, to be mixed with the syngas. It is also useful that the temperature of the hydrogen be above room temperature. High temperature, high pressure electrolysis would be desirable. A solid-oxide fuel cell (SOFL) operating in reverse mode may be used as well.

One potential problem with water splitting is that the engine excess mechanical power, when converted to electrical energy (assuming relatively high efficiencies) is enough to produce only about 10% of the oxygen required in the engine. Thus, either external electricity is required to drive the water-splitting unit, or the water splitting unit is used only for using the excess power produced by the engine. A second problem with the water-splitting option is that these apparatus may be expensive: a unit to produce about 12 tons of $O_2$ per day (1.5 tons of $H_2$ per day), is expected to be ~1-2 M$ by 2017. However, the electrolitical production of hydrogen can be used to adjust the $H_2/CO$ ratio in the chemical reactor 50, in the case that the engine reformer has composition that is slightly low in hydrogen.

In the case of natural gas as the fuel, and oxygen as the oxidant, there may be no need for a turbocharger or turbocharger, since the natural gas would be at pressures above atmospheric, and it would be possible to generate the oxygen above atmospheric, further decreasing the engine mechanical power requirements. It may be possible that only the natural gas needs to be compressed, while the oxygen is added to natural gas downstream from the turbocharger or supercharger.

It should be noted that the reciprocating machine 64 in FIGS. 8, 10 and 11 may also be used to compress the hydrocarbon fuel 21 before it enters the engine 20. Additionally, the reciprocating machine 64 may be used to compress the oxidant 22 (either air or oxygen) prior to its entry into the engine 20. In some cases, the syngas 40 produced by the engine 20 may be compressed to 20-30 bar using the reciprocating machine 64 before entering the chemical reactor 50. The fuel and the oxidant can be pressurized either together or separately.

Additionally, it should be noted that the generator 63 shown in FIGS. 8, 10 and 11 may also be used to produce excess electricity. In one embodiment, this electricity may be consumed by the reformer system 10. In another embodiment the electrical energy may be used to regenerate the particulate filter. In other embodiments, the electricity may not be used by the reformer system 10. For example, this electricity may be for external use, and may be provided for sale or used as part of a power station that includes production of both liquid fuels and electricity. Furthermore, the production of liquid fuels and electricity can be adjusted to meet the need for electricity. The engine operation can be adjusted by varying the speed, the torque, the composition of the oxidant/fuel mixture in one or more of the cylinders, in order to match the needs. In order to provide variable electricity/fuel production through varying composition on one or more of the cylinder, it is best to adjust the composition of one or more of the cylinder to full combustion of the fuel, with the exhaust of the cylinders adjusted to full combustion not sent to the chemical reactor 50 downstream of the engine. Some of the liquid fuel could be used in the engine during the time of high electricity demand, if there is not enough availability of natural gas. The engine could also combust the tail gas.

In summary, the mechanical power plant 60 receives energy from the engine 20 in the form of a rotating shaft 30. It can then transform this rotational energy into various other forms, depending on the needs of the system and environment. For example, in some embodiments, this power is used to energize air separation units, which separate air to provide purer oxygen to the engine 20. In other embodiments, the mechanical energy is used to compress one or both of the hydrocarbon fuel 21 and the oxidant 22 before they enter the engine 20. In other embodiments, electricity is generated, which may be used by the reformer system 10 or external to the system 10.

The use of engine based reformers can experience transients, including during startup and shutdown. By operating the engine in different oxidant/fuel ratios, it is possible to stabilize engine operation, and provide power/thermal energy for transients such as startup, shutdown, or change in throughput. It is possible to vary the engine operating conditions by operating with different conditions in different cylinders. The conditions can include pressure, temperature, oxidant-fuel ratio, stratification of the cylinders (thermal or composition). The use of injection timing, spark timing, valve timing, injection of diluents can be used to help address the problem with transients. Steady state conditions are achieved when all the components have reached desired temperatures, and the flows and pressure reached the desired value.

In the case of operation with oxygen as the oxidant 22, the engine 20 could operate in conditions of close to stoichiometric operation in air during startup, in order to provide power for the oxygen generating unit 62. As the oxygen starts being produced by the oxygen generating unit 62, the engine operation could change using oxygen enriched air, and richer composition. The inlet manifold pressure could also be changing during the transient. Steady state operation is achieved once the catalyst is warm, the heat exchangers 70 have reached temperature and the oxygen generating unit 62 is producing as much oxygen as required by the process. All this process is controlled through the use of a controller 90, which could drive the engine control unit (ECU).

As described above, the syngas can be used for the manufacture of liquid fuels, such as methanol or FT diesel. The chemical reactor 50 uses the syngas to produce the desired liquid fuel. The chemical reactor 50 may include a gas cleanup unit 51, which serves to remove undesirable components from the input gas stream and a fuel catalyst unit 52. In some embodiments, the chemical reactor, and specifically the fuel catalyst unit 52 utilizes the Fischer-Tropsch process to convert the syngas to a liquid hydrocarbon In this case, the chemical reactor 50 produces the following reaction:

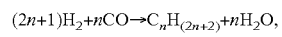

$$(2n+1)H_2 + nCO \rightarrow C_nH_{(2n+2)} + nH_2O,$$

where both reactants are provided by the syngas.

In order to manufacture the liquid fuels, a catalyst may be needed. The size and cost of system 10 may be dominated by the catalyst. It may be possible to operate at higher pressures, beyond optimal for production, in order to decrease the physical size of the system.

A range of catalysts can be used. Liquid-borne catalyst may be preferred if compact sizes are required, especially for methanol manufacturing (which is highly exothermic, requiring removal of substantial amounts of heat).

If there is left unprocessed syngas in the exhaust from the chemical reactor 50 (i.e. tail gas), as would be the case when the goal is not the highest conversion but a tradeoff between conversion and size, the tail gas can be reintroduced into the engine 20 (for either full combustion or to assist in the partial oxidation reaction), or one of the cylinders 23 of the engine 20 can be used to recompress the residual syngas and reintroduce it into the syngas upstream from the catalyst.

Having described each of the components of the system 10, it is noted that the system can be used in a variety of ways. For example, the system 10 can be utilized in a polygeneration system. In a polygeneration system, the system operation can be dynamically adjusted to produce electricity, syngas, or a combination of the two. For example, operation near $\phi=1$ in air produces only slightly more mechanical power than the rich operation in oxygen ($2.5<\phi<4.0$) needed for the generation of syngas. Although only a small fraction of the energy in the methane is released in the partial oxidation reaction, at same inlet manifold pressures, there is six times more methane in the cylinder in the case of partial oxidation in oxygen as compared to the methane in the cylinder in the case of stoichiometric operation in air. This is due to the reduced amount of oxygen and elimination of the nitrogen diluent in the case of stoichiometric natural gas operation.

Therefore, the engine 20 can be operated near stoichiometric conditions in air for electricity production, if connected to a generator 63. Alternatively, it can be run under rich conditions for reforming, generating enough power to support the power requirement of the unit. Of course, the engine 20 may be operated at any operating point in between. In the case of some of the cylinders operating in air stoichiometrically, the production of oxygen is reduced, and the power that would go to the oxygen generating plant can be used instead for production of additional electricity. Furthermore, the engine 20 can be configured such that a first set of cylinders 23 are operated at conditions conducive to the production of syngas, while a second set of cylinders may be operated near stoichiometric conditions to produce electricity. The number of cylinders 23 allotted to each function may be dynamically varied. The system may produce more electricity during parts of the day, where demand may be greater. The cylinders assigned to electricity generation may be configured for syngas production during time of low demand.

It may be possible to run the system 10 with a generator 63 that generates the desired phase/frequency, or it could generate a different frequency and use rectifiers/converters in order to generate the appropriate frequency/phase.

When operating for power, it may be possible to use one or more cylinders to continue to generate syngas, although at smaller throughput, in order to maintain temperatures. The engine 20 may be generating variable amount of syngas to keep the system 10 operating, with reduced flow rates. Heat exchangers 70 can be adjusted in order to prevent large changes in temperature.

In summary, using well-developed technologies, such as engines and associated equipment developed for mass production for vehicles, it is possible to make inexpensive, small scale reformers. The engine, in addition to reforming, produces syngas in conditions (temperature and pressure) that are suitable for production of GTL processes. The engine also recovers a fraction of the energy released in the conversion process, either as mechanical power or as electrical power, if a generator is coupled with it, such as in a conventional generator set.

In some embodiments, it may be preferred that the reformer be energy self-sufficient, not only because, in this case, it does not have to be connected to the grid, but also for economic issues. However, if connected to the grid, the system could either produce extra electricity delivered to the grid, or consume some from it if there is an electricity deficit.

It is necessary to cool the gas coming from the chemical reactor 50. The enthalpy can be used to preheat air (if the oxygen plant requires hot air), or the fuel/oxidized mixture.

A system can be designed to be small enough that it can be skid mounted. In one embodiment, a small system, using a heavy duty engine (15 liters) is proposed. The air separating unit, or oxygen generating system 62, may be relatively large, similar to the size of the catalyst. In one embodiment, it may be required to produce about 17 tons of oxygen (not necessarily of high purity) daily. Even in this embodiment, the entire methanol-generating system should fit on a skid, and generate about 100 bpd oil equivalent.

In the case of off-shore rigs, the natural gas can be used to generate methanol that can be either mixed with the oil crude, or it can be sent to shore in barges. The entire methanol manufacturing unit could be placed in a barge, separate from the oil rig. Methanol is not highly flammable, and would be safer to handle that either gasoline-like fuels or natural gas. In the case of spills, methanol degrades naturally very quickly. Alternatively, Fisher Tropsch fuels can be made, although at higher costs.

It may be beneficial to connect the engine 20 doing the reforming to a smaller reciprocating engine 64 that is better suited to do the other things, including compressing the air or oxygen, recompressing the left-over syngas (tail gas), and other matters that can be better handled with smaller displacement cylinders. In another case the engine 20 may be used for propulsion (such as to move the device) as well as for syngas generation.

Heavy duty diesel engines are suitable for the applications described above. However, there are substantial elements that may be eliminated from these engines. The expensive high-pressure injection systems, common in today's diesel engines, is not needed. In addition, expensive aftertreatment systems are also not needed. It may also be possible to use engines designed to operate on natural gas or even dual- or multi-fuel gas engines.

In addition, it is desirable to have compact systems for the generation of hydrogen rich gas from other hydrocarbons, such as gasoline.

The systems described here may be additionally advantageous for stranded natural gas where there is a substantial natural gas liquid content (propane, ethane, butane) and it is not economically attractive to separate out these molecules because of the small amount of output. An engine reformer could be advantageous because it does not utilize catalysts. A control system using sensor information would change engine reformer operating characteristics so as to ensure desired syngas quality and optimized efficiency when the natural gas liquid content varies.

The process described herein can be applied to any homogeneous chemical reaction that requires substantial increases in temperature and pressure. It is best when the reactions are exothermic, and it is desired to return the products at lower temperatures and pressures. In this case, it is possible to recapture some of the released energy in the expansion process. In the case of endothermic reactions, it is possible to drive the system so that only some of the cylinders are performing the desired endothermic operation, while the other cylinders are providing power through different exothermic reactions, including combustion reactions.

These features of an integrated system with optimized use of the reforming process energy released by mechanical power production could also be used to reduce cost of a turbine reformer-liquid fuel production system.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A spark ignition engine where at least one cylinder is operated with a rich hydrocarbon fuel to oxidant mixture and where the engine produces syngas that is used for producing liquid fuel;
   and where the oxidant and/or fuel is preheated prior to introduction into the engine so as to enable operation at a selected fuel to oxidant ratio without misfire;
   where the temperature in the cylinder is such as to be high enough to prevent misfire but does not exceed the temperature at which knock would occur; and
   wherein the syngas is compressed during an exhaust stroke and exits an exhaust valve at a pressure of at least 15 bar.

2. The spark ignition engine of claim 1, where the hydrocarbon fuel is methane and phi is greater than 2.5.

3. The spark ignition engine of claim 1, where the oxidant and/or fuel is preheated in a heat exchanger using heat from the exhaust produced by the engine.

4. The spark ignition engine of claim 1, where only the fuel is preheated.

5. The spark ignition engine of claim 1, where only the oxidant is preheated.

6. The spark ignition engine of claim 1, where the fuel and oxidant are both preheated.

7. The spark ignition engine of claim 1, where the oxidant is preheated to a temperature greater than 350 K.

8. The spark ignition engine of claim 1, where the oxidant is preheated to a temperature greater than 450 K.

9. The spark ignition engine of claim 1, where the preheating is such that the in-cylinder temperature at the time of valve closing is 350 K or greater.

10. The spark ignition engine of claim 1, where the in-cylinder temperature at time of valve closing is 425 K or greater.

11. The spark ignition engine of claim 1, where an electrically powered heater is used to preheat the fuel and/or oxidant.

12. The spark ignition engine of claim 1, where the sparking is advanced when the oxidant is air.

13. The spark ignition engine of claim 1, where the engine operates on methane and oxygen and the oxygen is provided by an oxygen production unit that is powered by the engine.

14. The spark ignition engine of claim 1, where the engine operates on methane and air.

15. The spark ignition engine of claim 1, where the engine operates on methane and oxygen-enriched air.

16. The spark ignition engine of claim 1, where the temperature in the cylinder is less than 550 K.

17. The spark ignition engine of claim 1, where engine efficiency is reduced in order to prevent knock.

18. The spark ignition engine of claim 1, wherein the syngas is compressed during the exhaust stroke and exits the exhaust valve at a pressure of at least 20 bar.

19. The spark ignition engine of claim 1, wherein an inlet manifold pressure is greater than 4 bar.

20. A spark ignition engine where at least one cylinder is operated with a rich hydrocarbon fuel to oxidant ratio and where the engine produces syngas that is used for producing liquid fuel by interaction with a chemical reactor that receives the syngas from the exhaust manifold of the engine;
   and where the oxidant and/or hydrocarbon fuel are preheated prior to introduction into the engine so as to enable operation at a selected hydrocarbon fuel to oxidant ratio without misfire;
   and where the temperature in the cylinder is high enough so as to prevent misfire, but does not exceed the temperature at which knock would occur;
   and where at least one engine cylinder provides compression of the syngas to a selected value during an exhaust stroke, such that the syngas is at the selected value as it passes through an exhaust valve and enters the exhaust manifold.

21. The spark ignition engine of claim 20, where compression in the engine cylinder is used to provide syngas with a pressure of at least 20 bar.

22. The spark ignition engine of claim 21, where the syngas has a pressure of between 20 and 30 bar.

23. The spark ignition engine of claim 21, where the VVT is employed to provide syngas with a pressure of at least 20 bar.

24. The spark ignition engine of claim 20, where the hydrocarbon is methane.

25. A reciprocating engine that uses compression ignition and operates with a rich hydrocarbon fuel to air ratio; and where the engine produces syngas that is used for producing liquid fuel by interaction with a chemical reactor that receives the syngas from the exhaust manifold of the engine and where at least one engine cylinder provides compression of the syngas to a selected value during an exhaust stroke, such that the syngas is at the selected value as it enters the exhaust manifold.

26. The reciprocating engine of claim 25, where compression in the engine cylinder is used to provide syngas with a pressure of at least 20 bar.

27. The reciprocating engine of claim 25, where the engine is operated in an HCCI mode.

28. The reciprocating engine of claim 25, where the engine is operated in a PCI mode.

29. The reciprocating engine of claim 25, where the engine is operated in an RCCI mode.

30. The reciprocating engine of claim 25, where the engine is operated on methane and air.

31. The reciprocating engine of claim 25, where the engine is operated on oxygen enriched air.

* * * * *